(12) United States Patent
Terashita et al.

(10) Patent No.: US 8,576,362 B2
(45) Date of Patent: Nov. 5, 2013

(54) LIQUID CRYSTAL DISPLAY DEVICE AND POLYMER FOR ALIGNMENT FILM MATERIALS

(71) Applicants: Shinichi Terashita, Osaka (JP); Isamu Miyake, Osaka (JP); Koichi Miyachi, Osaka (JP); Yuko Teraoka, Osaka (JP)

(72) Inventors: Shinichi Terashita, Osaka (JP); Isamu Miyake, Osaka (JP); Koichi Miyachi, Osaka (JP); Yuko Teraoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/647,728

(22) Filed: Oct. 9, 2012

(65) Prior Publication Data

US 2013/0107149 A1 May 2, 2013

Related U.S. Application Data

(63) Continuation of application No. 12/593,121, filed as application No. PCT/JP2008/053315 on Feb. 26, 2008, now Pat. No. 8,310,636.

(30) Foreign Application Priority Data

Mar. 26, 2007 (JP) .................................. 2007-080289

(51) Int. Cl.
*G02F 1/1337* (2006.01)

(52) U.S. Cl.
USPC .............................. 349/123; 349/130; 349/132

(58) Field of Classification Search
USPC ............................................... 349/123
See application file for complete search history.

(56) References Cited

U.S. PATENT DOCUMENTS

| | | |
|---|---|---|
| 5,856,431 A | 1/1999 | Gibbons et al. |
| 5,965,060 A | 10/1999 | Tarumi et al. |
| 6,201,588 B1 | 3/2001 | Walton et al. |
| 6,340,506 B1 | 1/2002 | Buchecker et al. |
| 6,383,579 B1 | 5/2002 | Park et al. |
| 6,852,374 B2 | 2/2005 | Mizusaki et al. |
| 8,310,636 B2 | 11/2012 | Terashita et al. |
| 2003/0039768 A1 | 2/2003 | Buchecker et al. |
| 2003/0087045 A1 | 5/2003 | Nakata |
| 2003/0118752 A1 | 6/2003 | Choi |
| 2005/0140904 A1 | 6/2005 | Choi |
| 2008/0274304 A1 | 11/2008 | Cherkaoui et al. |
| 2008/0293888 A1 | 11/2008 | Bachels et al. |
| 2010/0085523 A1 | 4/2010 | Terashita et al. |
| 2010/0128214 A1 | 5/2010 | Lee et al. |

(Continued)

FOREIGN PATENT DOCUMENTS

| | | |
|---|---|---|
| CN | 1637568 A | 7/2005 |
| CN | 1641449 A | 7/2005 |

(Continued)

OTHER PUBLICATIONS

Office Action issued in U.S. Appl. No. 12/593,121 on Mar. 28, 2012.

(Continued)

*Primary Examiner* — Lucy Chien
(74) *Attorney, Agent, or Firm* — Nixon & Vanderhye P.C.

(57) ABSTRACT

A liquid crystal display device suppresses generation of image sticking in AC mode. A liquid crystal display device comprises an alignment film arranged on at least one of a pair of substrates. The alignment film comprises a polymer containing a first constitutional unit and a second constitutional unit. The first constitutional unit controls alignment of the liquid crystal molecules by photoirradiation. The second constitutional unit controls alignment of the liquid crystal molecules regardless of photoirradiation.

6 Claims, 9 Drawing Sheets

(56) References Cited

U.S. PATENT DOCUMENTS

| | | |
|---|---|---|
| 2012/0076952 A1 | 3/2012 | Bachels et al. |
| 2013/0004679 A1 | 1/2013 | Bachels et al. |
| 2013/0083278 A1 | 4/2013 | Teraoka et al. |
| 2013/0107149 A1 | 5/2013 | Terashita et al. |
| 2013/0155362 A1 | 6/2013 | Terashita et al. |

FOREIGN PATENT DOCUMENTS

| | | |
|---|---|---|
| JP | 2001-517719 | 10/2001 |
| JP | 2003-066460 | 3/2003 |
| JP | 2003-098527 | 4/2003 |
| JP | 2003-520878 | 7/2003 |
| JP | 2003-222868 | 8/2003 |
| JP | 2005-250244 | 9/2005 |
| JP | 2006-010896 | 1/2006 |
| JP | 2006-052317 | 2/2006 |
| JP | 2006-267823 | 10/2006 |
| JP | 2007-256484 | 10/2007 |
| JP | 2008-299317 | 12/2008 |
| JP | 2009-511431 | 3/2009 |
| JP | 2009-520702 | 5/2009 |
| JP | 2009-216788 | 9/2009 |
| JP | 4434862 | 1/2010 |
| WO | 99/15576 | 4/1999 |
| WO | 01/53384 | 7/2001 |
| WO | WO 2005/083504 | 9/2005 |
| WO | 2007/052979 A1 | 5/2007 |
| WO | WO 2008/117615 | 10/2008 |
| WO | WO 2012/056936 A1 | 5/2012 |
| WO | WO 2012/056947 A1 | 5/2012 |

OTHER PUBLICATIONS

Restriction Requirement mailed Dec. 30, 2011 in U.S. Appl. No. 12/593,121.
Office Action mailed Jul. 9, 2011 in U.S. Appl. No. 12/593,121.
Notice of Allowance mailed Jul. 9, 2012 in U.S. Appl. No. 12/593,121.
International Search Report for PCT/JP2008/053315, mailed Apr. 1, 2008.
EP Supplementary Search Report mailed Mar. 23, 2010 in corresponding EP application 08711999.6.
U.S. Appl. No. 13/702,876, filed Dec. 7, 2012, entitled "Liquid Crystal Display Device".
International Search Report issued in PCT/JP2011/062837, dated Aug. 9, 2011.
Hasegawa, M., "Photo-Alignment: An Aligning Treatment from the Viewpoint of Production Process," Liquid Crystal, The Japanese Liquid Crystal Society, vol. 3, No. 1, pp. 3-16, Jan. 25, 1999.
Sawahata, K., "Trends in Development of Material for LCD Alignment Layer," Liquid Crystal, The Japanese Liquid Crystal Society, vol. 8. No. 4, pp. 216-224, Oct. 25, 2004.
Office Action mailed Jul. 29, 2011 in U.S. Appl. No. 12/593,121.
International Search Report for PCT/JP2011/068940 mailed Nov. 8, 2011.
Restriction Requirement issued in U.S. Appl. No. 13/702,876 dated Apr. 25, 2013.
International Search Report issued in Application No. PCT/JP2011/067051 dated Sep. 6, 2011.
U.S. Appl. No. 13/819,820, "Liquid Crystal Display Panel, Liquid Crystal Display Device, and Polymer for Alignment Film Material," Terashita, Shinichi et al., filed Feb. 28, 2013.
U.S. Appl. No. 13/819,883, "Liquid Crystal Display Panel, Liquid Crystal Display Device, and Polymer for Alignment Film Material," Terashita, Shinichi et al., filed Feb. 28, 2013.
Office Action issue in U.S. Appl. No. 13/819,883 dated Jun. 20, 2013.

LIQUID CRYSTAL DISPLAY DEVICE AND POLYMER FOR ALIGNMENT FILM MATERIALS

This application is a continuation of U.S. patent application Ser. No. 12/593,121, filed 25 Sep. 2009, which is the U.S. national phase of International Application No. PCT/JP2008/053315, filed 26 Feb. 2008, which designated the U.S. and claims priority to Japanese Patent Application No. 2007-080289, filed 26 Mar. 2007, the entire contents of each of which are hereby incorporated by reference.

TECHNICAL FIELD

The present invention relates to a liquid crystal display device and a polymer for alignment film materials. More particularly, the present invention relates to a liquid crystal display device with wide viewing angle characteristics, preferably used in planar displays that are used by many people, such as a PDA, a PC, a WP, amusement equipment, a teaching machine, and a TV device, or in a display board, a display window, a display door, a display wall, etc., each utilizing a shutter effect of liquid crystal. Further, the present invention relates to a polymer for alignment film materials.

BACKGROUND ART

A liquid crystal display device is now being widely used attributed to its characteristics such as slim profile, light weight, and low electrical power consumption. The liquid crystal display device includes a pair of substrates and a liquid crystal layer interposed there between. Further, the liquid crystal device provides display by controlling an alignment direction of liquid crystal molecules contained in the liquid crystal layer by appropriately applying a voltage to electrodes arranged on liquid crystal layer side-surfaces of the substrates. The liquid crystal display device usually includes an alignment film for controlling the alignment direction of the liquid crystal molecules, and the alignment film is arranged on the liquid crystal layer side-surface of the substrate.

As a material for such an alignment film constituting the liquid crystal display device, resins such as polyamic acids, polyimides, polyamides, and polyesters are conventionally used. Among them, polyimides have been much used for liquid crystal display devices attributed to its excellent physical properties such as heat resistance, affinity with liquid crystals, and mechanical strength compared with other organic resins.

The alignment film is typically subjected to an alignment treatment, and thereby the film can provide liquid crystal molecules that are positioned on the alignment film surface with specific pretilt angles. A rubbing method, a photo-alignment method, and the like, are mentioned as a method for the alignment treatment. According to the rubbing method, the alignment film surface is provided with the alignment treatment by being rubbed with a cloth wound on a roller. According to the photo-alignment method, a photo-alignment film is used as a material for the alignment film, and the photo-alignment film is irradiated with (exposed to) light such as ultra violet light, and thereby the alignment film is provided with an alignment regulating force and/or an alignment regulating direction of the alignment film is changed.

However, according to a liquid crystal display device including a conventional alignment film, image sticking might be generated on a screen when an image is displayed for a prolonged period. So there is room for improvement in that the image sticking is suppressed even when an image is displayed for a prolonged period.

In order to solve such a problem, for example, Patent Document 1 discloses a liquid crystal aligning agent composition containing a tetrafunctional silicon composition like tetrachalcoxylan, a trifunctional composition like trialcoxylan, and a product of reaction with 0.8 to 3.0 mol water for a 1 mol functional group like an alkoxy group, and a glycol ether solvent, as a technology of providing a liquid crystal aligning agent capable of forming a liquid crystal alignment film which prevents display defects, has an excellent afterimage characteristic even after long-time driving, does not decrease the capability of aligning liquid crystal, and has a small decrease in voltage holding rate against light and heat.

In addition, for example, Patent Document 2 discloses a liquid crystal alignment material including a polyamic acid having a structure derived from a monoamine compound or its imidized polymer, as a technology of providing a liquid crystal alignment material which can develop good coating film formability and liquid crystal alignment characteristics and can form a liquid crystal alignment layer capable of deleting afterimages in a short time after the stop of the application of a voltage in liquid crystal display elements.

In addition, for example, Patent Document 3 discloses a vertical liquid crystal aligning agent including 100 weight parts of a polymer with an amic acid repeating unit and/or an imide repeating unit and at least 5 weight parts of a compound having at least two epoxy groups in a molecule, as a technology of providing a liquid crystal aligning agent which provides a vertical liquid crystal alignment film excellent in image sticking characteristics and reliability even when the film is used with a reflection electrode.

For example, Non-patent Document 1, which is a document on an photo-alignment film, discloses that the smaller an electrical resistivity of a photo-alignment film is, the shorter an image sticking time is.

Further, for example, Non-patent Document 2, which is a document on development of a material for alignment films, discloses that a reduction in residual DC in a liquid crystal cell with a vertical electrical field leads to suppression of the image sticking.

In an AC driving liquid crystal display device, a residual DC is generated generally due to a difference in an offset voltage between electrodes formed on substrates facing each other.

In addition, for example, Patent Document 4 discloses polyimides containing a side chain group having a structure that can be derived from 3-arylacrylic acid, as photoreactive polymers that can produce a stable and high-resolution alignment pattern that show a defined pretilt angle and at the same time has a sufficient high resistance value (holding ratio) in a liquid crystal medium adjacent to the pattern when the pattern is irradiated with polarized light.

For example, Patent Document 5 discloses polyimides, incorporating cinnamic acid group derivatives in such a way that the cinnamic acid groups are linked to the polyimide main chain via a carboxylic group by means of a flexible spacer, as photoreactive polymers that can produce a stable and high-resolution alignment pattern that show a very large tilt angle and at the same time has a sufficient high holding ratio in a liquid crystal medium adjacent to the pattern when the pattern is irradiated with polarized light.

PATENT DOCUMENT 1

Japanese Kokai Publication No. 2005-250244

PATENT DOCUMENT 2

Japanese Kokai Publication No. 2006-52317

PATENT DOCUMENT 3

Japanese Kokai Publication No. 2006-10896

PATENT DOCUMENT 4

Japanese Kohyo Publication No. 2001-517719

PATENT DOCUMENTS 5

Japanese Kohyo Publication No. 2003-520878

NON-PATENT DOCUMENT 1

Masaki HASEGAWA, "HIKARI HAIKOU-seis an prosesu no kanten kara mita haikoushori," liquid crystal, The Japanese Liquid Crystal Society, Jan. 25, 1999, vol. 3, No. 1, p. 3-16

NON-PATENT DOCUMENT 2

Kiyoshi SAWAHATA, "LCD you haikoumaku no zairyou kaihatsu doukou," liquid crystal, The Japanese Liquid Crystal Society, Oct. 25, 2004, vol. 8, No. 4, p. 216-224

DISCLOSURE OF INVENTION

An image sticking phenomenon that is generated in residual DC (direct-current) mode has been a commonly known as the image sticking phenomenon in liquid crystal display devices. So a material for reducing the residual DC has been researched and developed as a measure for the image sticking on an alignment film material surface. The image sticking in DC mode can be dealt with by a conventional technology, for example, using a material (molecule) that less accumulates charges.

However, in the photo-alignment technology, which is now being employed instead of the rubbing method, the mechanism for generation of the image sticking is not determined yet, and so a solution for it is not proposed yet. For example, in the vertical photo-alignment films disclosed in Patent Documents 5 and 6, in addition to strong image sticking in residual DC mode, image sticking (in AC (alternative current) mode) caused by a change in pretilt angle by AC voltage application is generated. So the image sticking in both modes needs to be simultaneously solved.

A homopolymer or copolymer of only the photo-alignment film material (s) is not enough to solve particularly the image sticking in AC mode. In addition, according to an alignment film in which a conventional photofunctional group-containing vertical photo-alignment film and a conventional vertical alignment film are blended, uniformity of alignment is significantly reduced because a density of the photofunctional group-containing vertical photo-alignment film is reduced, and further, the alignment film can not provide liquid crystals with pretilt angles and so the pretilt angle hardly changes from 90°. The conventional vertical alignment film contains a vertical alignment functional group and has characteristics of aligning liquid crystal molecules in a direction substantially vertical to the alignment film surface without being provided with an alignment treatment such as rubbing and photoirradiation. In the alignment film in which the vertical photo-alignment film and the vertical alignment film are blended, the image sticking in AC mode is probably caused due to a polymer that is contained in a photo-alignment film material. So such a film is not enough to suppress the image sticking in AC mode.

The image sticking cause by AC voltage application is particularly strongly observed if a photo-alignment film (homopolymer) containing a photofunctional group that undergoes a photoreaction (e.g., a photocrosslinking reaction (including a photodimerization reaction), a photoisomerization reaction, a photodecomposition reaction) thereby providing a liquid crystal molecule with a pretilt angle, is used.

Liquid crystal display devices where a liquid crystal alignment treatment is provided in one direction in the substrate plan, like TN (twisted nematic), ECB (electrically controlled birefringence), and VATN (vertical alignment twisted nematic) liquid crystal display devices, etc., show display characteristics depending on viewing angle. So the direction where the image sticking phenomenon might be observed is the front direction and some directions different depending on the viewing angle characteristics of the devices themselves. In a liquid crystal TV, a large-screen advertising display, and the like, liquid crystals are aligned in different directions in view of viewing angle compensation under white display state. Thus, in the multi-domain mode where the viewing angle is compensated, the image sticking phenomenon is uniformly observed in every azimuth, and so suppression of the image sticking phenomenon is essential. In the present description, the VATN mode may be a so-called RTN (reverse twist nematic: vertical alignment in TN mode). Further, the ECB mode may be VAECB mode where liquid crystals are vertically aligned during non-voltage application and horizontally aligned during voltage application, or may be mode where liquid crystals are vertically aligned during voltage application and horizontally aligned during non-voltage application, The present invention has been made in view of the above-mentioned state of the art. The present invention has an object to provide a liquid crystal display device capable of suppressing generation of the image sticking in AC mode and a polymer for alignment film materials.

The present inventors made various investigations on a liquid crystal display device capable of suppressing generation of the image sticking in AC mode (herein after, also referred to as "AC image sticking") and a polymer for alignment film materials contained in the alignment film. The inventors noted a mechanism for generation of the AC image sticking. Then, the inventors found that the following two are mentioned as the mechanism for generation of the AC image sticking. One is that a side chain part of the alignment film deforms by a stress caused by elastic deformation of a liquid crystal molecule (side-chain deformation memory). The other is that a liquid crystal molecule is adsorbed to a functional group whose main chain has a high polarizability by AC application (liquid crystal adsorption).

The reasons why the AC image sticking is generated in the conventional photo-alignment film are mentioned in more detail below with reference to FIGS. 22 and 23. FIG. 22 is a cross-sectional view schematically showing a vicinity of a conventional photo-alignment film surface and explaining a mechanism for generation of AC image sticking due to side-chain deformation. FIG. 22(a) shows an initial state. FIG. 22(b) shows a state when an electrical field is applied to a liquid crystal layer. FIG. 22(c) shows a state when the application of the electrical field to the liquid crystal layer is stopped. Further, FIG. 23 is a cross-sectional view schematically showing a vicinity of a conventional photo-alignment film surface and explaining a mechanism for generation of AC image sticking due to liquid crystal adsorption. FIG. 23(a) shows an initial state. FIG. 23(b) shows a state when an electrical field is applied to a liquid crystal layer. FIG. 23(c) shows a state when the application of the electrical field to the liquid crystal layer is stopped.

The mechanism for generation of the AC image sticking due to the side-chain deformation is mentioned below. As shown in FIG. 22(a), in the initial state, liquid crystal molecules 111 contained in a liquid crystal layer 120 and side chains 131 of a photo-alignment film 130 interact with each other, and the molecules 111 are pre-tilted. Then, as shown in FIG. 22(b), when an electrical field is applied to the liquid crystal layer 120, the molecules 111 are bend-deformed and an elastic energy due to the bending deformation is generated, and then, the side chains 131 are inclined in accordance with the molecules 111 in order to decrease the elastic energy. Then, as shown in FIG. 22(c), when the electrical field is stopped, the side chains 131 exhibit its restoring force. However, the interface of the photo-alignment film 130 is crystallized compared to a bulk of the liquid crystal layer 120. So a releasing time it takes for the side chains 131 to return to its original structure is long. During the releasing time, the pretilt angle of the liquid crystal layer 120 is also changed, resulting in generation of the image sticking.

The mechanism for generation of the AC image sticking due to the liquid crystal adsorption is mentioned below. That is, when light such as ultra violet light is radiated to the photo-alignment film 130, a space in size equivalent to the liquid crystal molecule 111 is generated between molecules (main chains 125) of the photo-alignment film 130. In the initial state, as shown in FIG. 23(a), a part where the liquid crystal molecule 111 is adsorbed to the main chain 125, that is, an adsorbing liquid crystal, exists. Then, as shown in FIG. 23(b), when an electrical field is applied to the liquid crystal layer 120, the molecules 111 are bend-deformed and an elastic energy due to the bending deformation is generated, and then, the molecules 111 that are near the photo-alignment film 130 pass through the side chains 131 and aligned with the absorbing liquid crystal. As shown in FIG. 23(c), when the application of the electrical field to the liquid crystal layer 120 is stopped, the side chain 131 exhibits its restoring force, but the interface of the photo-alignment film 130 has a larger adsorbing property compared with a bulk of the liquid crystal layer 120. So a releasing time it takes the liquid crystal molecules 111 near the photo-alignment film 130 to show an original tilt angle again is long. During the releasing time, the pretilt angle of the liquid crystal layer 120 is also changed, resulting in generation of the image sticking.

The inventors further made investigations, and then found the followings. If a polymer contained in an alignment film material includes the following constitutional units. One constitutional unit is sensitive to light and is likely to be easily provided with an alignment treatment by photoirradiation, but easily undergo the side-chain deformation or cause the liquid crystal adsorption. The other constitutional unit can control alignment regardless of photoirradiation. That is, a film formed from an alignment film material including a polymer containing a constitutional unit exhibiting a property of controlling alignment of the liquid crystal molecules by photoirradiation and a constitutional unit exhibiting the property of controlling alignment of the liquid crystal molecules regardless of photoirradiation is provided with an alignment treatment by photoirradiation, and thereby the AC image sticking can be suppressed. As a result, the above-mentioned problems have been admirably solved, leading to completion of the present invention.

That is, the present invention is a liquid crystal display device including:

a pair of substrates;

a liquid crystal layer containing liquid crystal molecules; and an alignment film, the liquid crystal layer being interposed between the pair of substrates, the alignment film being arranged on a liquid crystal layer side-surface of at least one of the pair of substrates, wherein the alignment film is obtain able by providing a film with an alignment treatment by photoirradiation, the film being formed from an alignment film material, the alignment film material including a polymer containing a first constitutional unit and a second constitutional unit, the first constitutional unit exhibiting a property of controlling alignment of the liquid crystal molecules by photoirradiation, the second constitutional unit exhibiting the property of controlling alignment of the liquid crystal molecules regardless of photoirradiation (hereinafter, also referred to as a "first liquid crystal display device of the present invention").

The first liquid crystal display device of the present invention is described in more detail below.

According to the first liquid crystal display device of the present invention, a liquid crystal layer containing liquid crystal molecules is interposed between a pair of substrates, and an alignment film is arranged on a liquid crystal layer-side surface of at least one of the pair of substrates.

The configuration of the first liquid crystal display device of the present invention is not especially limited as long as the first liquid crystal display device essentially includes such standard components a common liquid crystal display device has. The first liquid crystal display device may or may not include other components.

The first liquid crystal display device of the present invention may be a passive matrix liquid crystal display device, but preferably an active matrix liquid crystal display device. Thus, it is preferable that the first liquid crystal display device includes pixels arranged in a matrix pattern, the pixels including a pixel electrode and a common electrode, the pixel electrode being arranged in a matrix pattern on a liquid crystal layer side-surface of one of the pair of substrates, and the common electrode being arranged on a liquid crystal layer side-surface of the other substrate.

It is preferable that the alignment film is arranged on liquid crystal layer side-surfaces of the both substrates in order to improve display qualities and responsiveness of the first liquid crystal display device.

In order to more suppress the AC image sticking, it is preferable that the first liquid crystal display device includes, on liquid crystal layer-side surfaces of the both substrates, an alignment film obtain able by providing a film with an alignment treatment by photoirradiation, the film being formed from an alignment film material, the alignment film material including a polymer containing a first constitutional unit and a second constitutional unit, the first constitutional unit exhibiting a property of controlling alignment of the liquid crystal molecules by photoirradiation, the second constitutional unit exhibiting the property of controlling alignment of the liquid crystal molecules regardless of photoirradiation.

The above-mentioned alignment film is obtain able by providing a film with an alignment treatment by photoirradiation, the film being formed from an alignment film material including a polymer containing a first constitutional unit and a second constitutional unit. The first constitutional unit exhibits the property of controlling alignment of the liquid crystal molecules by photoirradiation. The second constitutional unit exhibits the property of controlling alignment of the liquid crystal molecules regardless of photoirradiation. According to this, the AC image sticking can be suppressed even if the alignment film is provided with an alignment treatment by photoirradiation, and thereby a liquid crystal display device having excellent display qualities can be provided, and advantages in terms of production processes of the photo-alignment method can be taken. In addition, a coating property of the alignment film material can be improved. For example, the advantages of the photo-alignment method are as follows: the alignment film can be subjected to the alignment treatment in a contact-less manner, and so soils, dusts, and the like, which are generated by the alignment treatment, can be reduced; generation of display defects (such as rubbing line), which might be caused by a mechanical alignment treatment such as a rubbing method, can be suppressed; and the alignment film is exposed through a photomask where transmissive parts are formed in a desired pattern, and thereby each pixel can be easily divided into plural domains with a desired design (planar shape).

In the polymer, how the constitutional units are distributed is not especially limited. The polymer may be any of an alternating copolymer, a block copolymer, a random copolymer, and a graft copolymer. The molecular weight of the polymer is not especially limited, but it is preferable the polymer has a molecular weight suitable for use as the alignment film, similarly to a polymer contained in a conventional alignment film material. The proportion of each constitutional unit in the polymer is not especially limited, but a preferable ratio (% by weight) between the two constitutional units is mentioned below.

The alignment film is provided with an alignment treatment by photoirradiation (preferably, ultra violet light-irradiation). So it is preferable that the alignment film is sensitive to light, particularly UV light, and more specifically, it is preferable that the alignment film reacts to light, particularly UV light at a smaller exposure energy in a short time. In order to shorten a tact time in the production process, the alignment film is preferably photoirradiated at an exposure energy of 100 mJ/cm$^2$ or less, and more preferably at an exposure energy of 50 mJ/cm$^2$ or less. If the alignment film is provided with an alignment treatment by compartmentalizing each pixel region into some regions and separately exposing the regions through a light-shielding mask (photomask) and the like, it is preferable that the alignment film is photoirradiated at an exposure energy of 20 mJ/cm$^2$ or less.

Preferable embodiments of the first liquid crystal display device of the present invention are mentioned in more detail below.

As means for exhibiting the property of controlling alignment of the liquid crystal molecules by photoirradiation in the first constitutional unit, a photofunctional group is preferable, and particularly a photofunctional group contained in a side chain of the first constitutional unit is preferable. As a result, the first liquid crystal display device can be more easily provided, and the AC image sticking can be more effectively reduced. Thus, it is preferable that the first constitutional unit contains a photofunctional group, and it is more preferable that the first constitutional unit has a side chain containing a photofunctional group.

In the present description, the photofunctional group is not especially limited as long as it is a functional group capable of exhibiting the property of controlling alignment of the liquid crystal molecules by photoirradiation. The photofunctional group is preferably a group that can undergo at least one of a crosslinking reaction (including a dimerization), a decomposition reaction, an isomerization reaction, and a photorealignment reaction, more preferably at least one of a crosslinking reaction (including a dimerization), a isomerization reaction, and a photorealignment reaction, by light, preferably UV light, and more preferably polarized UV light.

As means for exhibiting the property of controlling alignment of the liquid crystal molecules regardless of photoirradiation in the second constitutional unit, an alignment functional group is preferable, and an alignment functional group that is contained in a side chain of the second constitutional unit is particularly preferable. As a result, the first liquid crystal display device can be more easily provided, and the AC image sticking can be more effectively reduced. Thus, it is preferable that the second constitutional unit contains an alignment functional group, and it is more preferable that the second constitutional unit has a side chain containing an alignment functional group.

The alignment functional group is not especially limited as long as it is a functional group capable of exhibiting the property of controlling alignment of the liquid crystal molecules regardless of photoirradiation, and publicly known alignment functional groups such as a vertical alignment functional group and a horizontal alignment functional group may be used. The vertical alignment functional group is not especially limited as long as it is a functional group capable of exhibiting a property of vertically aligning liquid crystal molecules, but preferably a functional group capable of exhibiting such a property by rubbing or without any treatment, more preferably without any treatment, i.e., without the alignment treatment. The horizontal alignment functional group is not especially limited as long as it is a functional group capable of exhibiting a property of horizontally aligning liquid crystal molecules, but preferably a group capable of exhibiting such a property by rubbing or without any treatment.

Thus, the first liquid crystal display device may be a liquid crystal display device including: a pair of substrates; a liquid crystal layer containing liquid crystal molecules; and an alignment film, the liquid crystal layer being interposed between the pair of substrates, the alignment film being arranged on a liquid crystal layer side-surface of at least one of the pair of substrates, wherein the alignment film is obtain able by providing a film with an alignment treatment by photoirradiation, the film being formed from an alignment film material, the alignment film material including a polymer containing the following two constitutional units: one containing a photofunctional group and controlling an alignment direction of liquid crystal molecules that are positioned on the alignment film surface by photoirradiation to the alignment film; the other containing an alignment functional group and controlling an alignment direction of liquid crystal molecules that are positioned on the alignment film surface regardless of photoirradiation to the alignment film.

It is preferable that the first and second constitutional units align the liquid crystal molecules in the same direction. As a result, the first liquid crystal display device can be effectively driven in a single liquid crystal mode such as VATN, TN, ECB, IPS (in-plane switching) modes. The same direction is not necessarily strictly the same direction, and may be almost the same direction as long as the device can be driven in a single liquid crystal mode.

From the same viewpoint, it is preferable that the alignment film uniformly controls the liquid crystal molecules in a plane of the alignment film. In the present description, the term "uniformly" does not necessarily mean that the liquid crystal molecules are aligned strictly uniformly as long as a single liquid crystal mode can be achieved.

In order to effectively drive the first liquid crystal display device in VA mode such as VATN mode, it is preferable that the alignment film is a vertical alignment film that aligns the liquid crystal molecules vertically. In the present description, the term "vertically" does not necessarily mean that the liquid crystal molecules are aligned strictly vertically to the alignment film surface, and may be aligned vertically to the alignment film surface to such an extent that VA mode such as VATN mode can be achieved.

More specifically, in order to effectively drive the first liquid crystal display device in VA mode such as VATN mode, it is preferable that the alignment film aligns the liquid crystal molecules in such a way that an average pretilt angle of the liquid crystal layer is 87° to 89.5°, more preferably 87.5° to 88.5°. As a result, the liquid crystal display device in VATN mode excellent in viewing angle characteristics, responsiveness, and light transmittance, can be provided. More specifically, in order to suppress adverse effects on contrast in VATN mode (suppress increase in luminance under black display state), it is preferable that the alignment film aligns the liquid crystal molecules in such a way that an average pretilt angle of the liquid crystal layer is 87° or more, and more preferably 87.5° or more. In order to suppress an afterimage that is generated when a display face is pressed and to adjust an extinction position within a plus or minus 5° under the conditions of: polarization plates that are arranged in Cross-Nicol state are rotated 45°; and a voltage applied to the liquid crystal layer of 7.5V, it is preferable that the alignment film aligns the liquid crystal molecules in such a way that an average pretilt angle of the liquid crystal layer is 89.5° or less, and more preferably 88.5° or less.

In order to effectively drive the first liquid crystal display device in VA mode such as VATN mode, it is preferable that the second constitutional unit has a side chain containing a vertical alignment functional group. As a result, the liquid crystal display device in VA mode such as VATN mode can be easily provided.

In the present description, the average pretilt angle of the liquid crystal layer is an angle made by a substrate surface and a direction (polar angle direction) of an average profile (director) of liquid crystal molecules in the thickness direction of the liquid crystal layer under no voltage application between the substrates. An apparatus for measuring the average pretilt angle of the liquid crystal layer is not especially limited, and a commercially available tilt angle-measuring apparatus (product of SHINTEC, Inc., trade name: OPTIPRO) may be mentioned, for example. According to this apparatus, a substrate surface is defined as 0° and the direction vertical to this substrate surface is defined as 90°, and the average profile of liquid crystal molecules in the thickness direction of the liquid crystal layer is measured as a pretilt angle. So such an apparatus is preferably used to measure the average pretilt angle. It is considered that the average pretilt angle of the liquid crystal layer depends on a profile of liquid crystal molecules near an alignment film (on an interface between the liquid crystal layer and the alignment film), and the liquid crystal molecules that are positioned on the interface induce elastic deformation of liquid crystal molecules in the bulk (middle) of the liquid crystal layer. In addition, it is considered that the profile of the liquid crystal molecules is different between the vicinity of the alignment film (interface) and the bulk (middle) of the liquid crystal layer, and to be exact, the directions of profiles (polar angle directions) of the liquid crystal molecules are also different between the two.

The following embodiments are preferable in order to effectively drive the first liquid crystal display device in VATN mode and stably adjust the average pretilt angle of the liquid crystal layer to 87° to 89.5°, which is a suitable angle in VATN mode, and further, more suppress the AC image sticking. It is preferable that the first constitutional unit has a side chain containing at least one photofunctional group selected from the group consisting of a coumarin group, a cinnamate group, a chalcone group, an azobenzene group, and a stilbene group. It is preferable that the second constitutional unit has a side chain containing a steroid skeleton. The second constitutional unit may have a side chain having a structure in which three or four rings of 1,4-cyclohexylene and/or 1,4-phenylene are linearly bonded to one another directly or with 1,2-ethylene there between. That is, the second constitutional unit may be the following unit. The unit has a side chain having a structure where three or four rings are linearly bonded to one another, and the three or four rings are each independently selected from 1,4-cyclohexylene and 1,4-phenylene, and the three or four rings are each independently bonded to one another through a single bond or with 1,2-ethylene there between. In addition, it is preferable that the second constitutional unit has a side chain having a structure where three or four rings are linearly bonded to one another, two rings on the end of the three or four rings are 1,4-phenylene, and one or two rings on the main chain side of the three or four rings are each independently selected from 1,4-cyclohexylene and 1,4-phenylene, and the three or four rings are bonded to one another through a single bond. It is preferable that the polymer has at least one main chain structure selected from the group consisting of a polyamic acid, a polyimide, a polyamide, and a polysiloxane. It is preferable that each of the first and second constitutional units is derived from a diamine. It is preferable that the polymer is a copolymer obtain able by polymerizing a monomer component containing a diamine and at least one of an acid anhydride and a dicarboxylic acid.

The polymer may be a polyamide-imide polymer. In order to improve heat resistance and electrical characteristics of the alignment film, it is more preferable that the polymer has a main chain structure of at least one of a polyamic acid and a polyimide. That is, the polymer is more preferably a copolymer obtain able by polymerizing a monomer component containing a diamine and an acid anhydride.

In order to more effectively suppress the AC image sticking, it is preferable that a ratio by weight (introduction ratio) of a monomer component of the second constitutional unit to a monomer component of the first constitutional unit is 4% to 40%, and more preferably 15% to 40%. In order to more effectively suppress the AC image sticking and more increase the average pretilt angle of the liquid crystal layer in VATN mode, a ratio by weight of a monomer component of the second constitutional unit to a monomer component of the first constitutional unit is preferably 4% or more, and more preferably 15% or more. In order to more effectively suppress the AC image sticking and to more decrease the average pretilt angle of the liquid crystal layer in VATN mode, it is preferable that a ratio by weight of a monomer component of the second constitutional unit to a monomer component of the first constitutional unit is 40% or less.

It is preferable that the liquid crystal display device includes pixels arranged in a matrix pattern, each of the pixels including a pixel electrode and a common electrode, the pixel electrode being arranged in a matrix pattern on a liquid crystal layer side-surface of one of the pair of substrates, the common electrode being arranged on a liquid crystal layer side-surface of the other substrate, wherein each of the pixel includes two or more domains adjacent to each other. According to such an embodiment, a boundary between adjacent two domains is redundantly exposed, and in such a part (doubly-exposed part), the AC image sticking tends to be strongly generated. In the doubly-exposed part, the pretilt angle of the liquid crystal molecules tends to vary. However, if the alignment film of the present invention is applied to this embodiment, the AC image sticking and the variation in pretilt angle of the liquid crystal molecule in the doubly-exposed part can be effectively suppressed, and the viewing angle can be increased. In addition, in order to increase the viewing angle in four directions, for example, upper, lower, right, and left directions, it is preferable that the pixel has four domains.

Thus, it is preferable in the liquid crystal display device that each pixel region is compartmentalized into some regions and the regions are separately exposed (photoirradiated), and thereby alignment division is provided for the device. VATN and ECB mode is preferable and VATN mode is particularly preferable as the multi-domain liquid crystal mode.

The above-mentioned various embodiments in the first liquid crystal display device may be appropriately combined.

The present invention is also a liquid crystal display device including: a pair of substrates; a liquid crystal layer containing liquid crystal molecules; and an alignment film, the liquid crystal layer being interposed between the pair of substrates, the alignment film being arranged on a liquid crystal layer side-surface of at least one of the pair of substrates, wherein the alignment film includes a polymer containing: a third constitutional unit having a structure derived from a photofunctional group; and a fourth constitutional unit having an alignment functional group (herein after, also referred to as a "second liquid crystal display device of the present invention").

The second liquid crystal display device of the present invention is described in more detail below.

According to the second liquid crystal display device, a liquid crystal layer containing liquid crystal molecules is interposed between a pair of substrates, and an alignment film is arranged on a liquid crystal layer-side surface of at least one of the pair of substrates.

The configuration of the second liquid crystal display device is not especially limited as long as the second liquid crystal display device essentially includes such standard components a common liquid crystal display device has.

The second liquid crystal display device may be a passive matrix liquid crystal display device, but preferably an active matrix liquid crystal display device. Thus, it is preferable that the second liquid crystal display device includes pixels arranged in a matrix pattern, the pixels including a pixel electrode and a common electrode, the pixel electrode being arranged in a matrix pattern on a liquid crystal layer side-surface of one of the pair of substrates, and the common electrode being arranged on a liquid crystal layer side-surface of the other substrate.

From the same viewpoint as mentioned in the first liquid crystal display device, according to the second liquid crystal display device, it is preferable that the alignment film is arranged on liquid crystal layer side-surfaces of the both substrates, and further it is preferable that the second liquid crystal display device includes an alignment film on liquid crystal layer-side surfaces of the both substrates, and the alignment film includes a polymer containing: a third constitutional unit having a structure derived from a photofunctional group; and a fourth constitutional unit having an alignment functional group without a photofunctional group and a structure derived from a photofunctional group.

The alignment film includes a polymer containing: the third constitutional unit having a structure derived from a photofunctional group, and the fourth constitutional unit having an alignment functional group without a structure derived from a photofunctional group. As a result, the second liquid crystal display device can exhibit the same effects as in the first liquid crystal display device.

The structure derived from the photofunctional group is not especially limited, and preferably is at least one structure selected from the group consisting of a photofunctional group-bonding structure, a decomposition reaction, a photoisomerization structure, and a photorealignment structure.

More specifically, the structure derived from the photofunctional group is at least one structure selected from the group consisting of a photofunctional group-bonding structure, a photofunctional group-decomposition structure, a photofunctional group-photoisomerization structure, and a photofunctional group-photorealignment structure.

The photofunctional group-bonding structure is a structure resulting from bonding of photofunctional groups by photoirradiation. It is preferable that this structure is formed through a crosslinking reaction (including a dimerization reaction).

The photofunctional group-decomposition structure is a structure resulting from decomposition of a photo-functional group by photoirradiation.

The photofunctional group-photoisomerization structure is a structure resulting from isomerization of a photofunctional group by photoirradiation. Accordingly, the third constitutional unit has, for example, a structure obtained when a cis-(trans-)photofunctional group is changed into its trans-(cis-)photofunctional group through an excitation state by photoirradiation.

The photofunctional group-photorealignment structure is a structure resulting from photorealignment of a photofunctional group. The photorealignment means that a photofunctional group changes only its direction by photoirradiation without being isomerized. Accordingly, the third constitutional unit has, for example, a structure obtained when a cis-(trans-)photofunctional group changes its direction through an excitation state without being isomerized by photoirradiation.

In the polymer, how the constitutional units are distributed is not especially limited. The polymer may be any of an alternating copolymer, a block copolymer, a random copolymer, and a graft copolymer. The molecular weight of the polymer is not especially limited, but it is preferable that the polymer has a molecular weight suitable for use as the alignment film, similarly to a polymer contained in a conventional alignment film. The proportion of each constitutional unit in the polymer is not especially limited, but a preferable ratio (% by weight) between the two constitutional units is mentioned below.

The alignment film is provided with an alignment treatment by photoirradiation (preferably, UV light-irradiation). So it is preferable that the alignment film is sensitive to light, particularly UV light, and more specifically, it is preferable that the alignment film reacts to light, particularly UV light with a smaller exposure energy and in a short time. In order to shorten a tact time in the production process, the alignment film is preferably photoirradiated at an exposure energy of 100 $mJ/cm^2$ or less, and more preferably at an exposure energy of 50 $mJ/cm^2$ or less. If the alignment film is provided with an alignment treatment by compartmentalizing each pixel region into some regions and separately exposing the regions through a light-shielding mask (photomask) and the like, it is preferable that the alignment film is photoirradiated at an exposure energy of 20 mJ/cm$^2$ or less.

Preferable embodiments of the second liquid crystal display device are mentioned in more detail below.

In order to more uniformly align liquid crystal molecules, that is, suppress a variation in pretilt angle, it is preferable that the third constitutional unit has at least one structure selected from the group consisting of a photofunctional group-bonding structure, a photoisomerization structure, and a photorealignment structure.

It is preferable that the third constitutional unit has a side chain having a structure derived from a photofunctional group. It is preferable that the fourth constitutional unit has a side chain containing an alignment functional group but not having a structure derived from a photofunctional group. As a result, the second liquid crystal display device can more easily provided, and the AC image sticking can be more effectively reduced.

The alignment functional group is not especially limited as long as it is a functional group capable of exhibiting a property of controlling alignment of liquid crystal molecules regardless of photoirradiation, and publicly known alignment functional groups such as a vertical alignment functional group and a horizontal alignment functional group may be used. Similarly to the first liquid crystal display device, the vertical alignment functional group is preferably a functional group capable of exhibiting a property of aligning liquid crystal molecules vertically by rubbing or without any treatment, more preferably without any treatment, i.e., without the alignment treatment. The horizontal alignment functional group is preferably a functional group capable of exhibiting a property of aligning liquid crystal molecules horizontally by rubbing or without any treatment.

From the same viewpoint as in the first liquid crystal display device, according to the second liquid crystal display device, the following embodiments are preferable. It is preferable that the third and fourth constitutional units align the liquid crystal molecules in the same direction. It is preferable that the alignment film uniformly controls alignment of the liquid crystal molecules in a plane of the alignment film. It is preferable that the alignment film is a vertical alignment film that aligns liquid crystal molecules vertically. It is preferable that the alignment film aligns the liquid crystal molecules in such a way that an average pretilt angle of the liquid crystal layer is 87° or more, and more preferably 87.5° or more. It is preferable that the alignment film aligns the liquid crystal molecules in such a way that an average pretilt angle of the liquid crystal layer is 89.5° or less, more preferably 88.5° or less. It is preferable that the alignment film aligns the liquid crystal molecules in such a way that an average pretilt angle of the liquid crystal layer is 87° to 89.5°, more preferably 87.5° to 88.5°. It is preferable that the fourth constitutional unit has a side chain containing a vertical alignment functional group. It is preferable that the third constitutional unit has a side chain having a structure derived from at least one photofunctional group selected from the group consisting of a coumarin group, a cinnamate group, a chalcone group, an azobenzene group, and a stilbene group. It is preferable that the fourth constitutional unit has a side chain containing a steroid skeleton. The fourth constitutional unit may have a side chain having a structure where three or four rings of 1,4-cyclohexylene and/or 1,4-phenylene are linearly bonded to one another directly or with 1,2-ethylene there between. That is, the fourth constitutional unit may be the following unit. The unit has a side chain having a structure where three or four rings are linearly bonded to one another, and the three or four rings are each independently selected from 1,4-cyclohexylene and 1,4-phenylene, and the three of four rings are each independently bonded to one another through a single bond or with 1,2-ethylene there between. In addition, it is more preferable that the second constitutional unit has a side having a structure where three or four rings are linearly bonded to one another, and two rings on the end of the three of four rings are 1,4-phenylene, and one or two rings on the main chain side of the three or four rings are each independently selected from 1,4-cyclohexylene and 1,4-phenylene, and the three or four rings are bonded to one another through a single bond. It is preferable that the polymer has at least one main chain structure selected from the group consisting of a polyamic acid, a polyimide, a polyamide, and a polysiloxane. It is preferable that each of the third and fourth constitutional units is derived from a diamine. It is preferable that the polymer is a copolymer obtain able by polymerizing a monomer component containing a diamine and at least one of an acid anhydride and a dicarboxylic acid. The polymer may be a polyimide-amide polymer. It is more preferable that the polymer has a main chain structure of at least one of a polyamic acid and a polyimide. The polymer is more preferably a copolymer obtain able by polymerizing a monomer component containing a diamine and an acid anhydride. It is preferable that a ratio by weight of a monomer component of the fourth constitutional unit to a monomer component of the third constitutional unit is preferably 4% or more, and more preferably 15% or more. It is preferable that a ratio by weight of a monomer component of the fourth constitutional unit to a monomer component of the third constitutional unit is 40% or less. It is preferable that a ratio by weight (introduction ratio) of a monomer component of the fourth constitutional unit to a monomer component of the third constitutional unit is 4% to 40%, and more preferably 15% to 40%. It is preferable that the liquid crystal display device includes pixels arranged in a matrix pattern, the pixels including a pixel electrode and a common electrode, the pixel electrode being arranged in a matrix pattern on a liquid crystal layer side-surface of one of the pair of substrates, the common electrode being arranged on a liquid crystal layer side-surface of the other substrate, wherein the pixels include two or more domains adjacent to each other. It is preferable that the pixel has four domains. It is preferable in the liquid crystal display device that each pixel region is divided into some regions and the regions are separately exposed (photoirradiated), and thereby alignment division is provided for the device. VATN and ECB mode is preferable and VATN mode is particularly preferable as the multi-domain liquid crystal mode. Thus, the various embodiments in the first liquid crystal display device can be appropriately applied to the second liquid crystal display device.

The above-mentioned various embodiments in the second liquid crystal display device are appropriately combined.

The present invention is also a polymer for alignment film materials, included in an alignment film material for the alignment film included in the above-mentioned liquid crystal display devices. According to this, the AC image sticking in a liquid crystal display device can be suppressed, and a liquid crystal display device with excellent display qualities can be provided. In addition, the alignment film can be provided with an alignment treatment by a photo-alignment method, and a liquid crystal display device can be easily provided. In addition, a coating property of an alignment film material can be improved.

The various embodiments of the polymers in the first and second liquid crystal display devices of the present invention can be appropriately applied to the polymer for alignment film materials of the present invention.

EFFECT OF THE INVENTION

According to the liquid crystal display device and the polymer for alignment film materials of the present invention, generation of the AC image sticking can be suppressed.

BEST MODES FOR CARRYING OUT THE INVENTION

The present invention is mentioned in more detail below with reference to Embodiments using drawings, but not limited to only these Embodiments. In the present Embodiment, a VATN liquid crystal display device is mentioned in detail, but the present invention can be applied to horizontal alignment TN, IPS, and ECB devices, and suppression of the AC image sticking is expected. That is, if the present invention is applied to a horizontal alignment device, the following copolymer may be used as a polymer included in an alignment film material. The copolymer is obtain able by polymerizing a constitutional unit having a side chain not containing a vertical alignment functional group (for example, a diamine) or a constitutional unit having a side chain containing a hydrophilic functional group or a horizontal alignment functional group (for example, a diamine) with a constitutional unit containing a horizontal alignment photofunctional group (for example, a diamine).

Embodiment 1

The present Embodiment is mentioned in the following order: 1. alignment film material; 2. preparation method of alignment film; 3. basic operations of liquid crystal display device; 4. production method of liquid crystal display device; and 5. evaluation test of AC image sticking 1. Alignment Film Material The alignment film material of the present Embodiment includes a polymer essentially containing a first constitutional unit and a second constitutional unit. The first constitutional unit exhibits a property of controlling alignment of liquid crystal molecules by photoirradiation. The second constitutional unit exhibits a property of controlling alignment of liquid crystal molecules regardless of photoirradiation. More particularly the first constitutional unit has a side chain containing a photofunctional group, and the second constitutional unit has a side chain containing a vertical alignment functional group. Thus, the side chain of the second constitutional unit contains a functional group that aligns liquid crystal molecules vertically, that is, a functional group that aligns the liquid crystal molecules substantially vertically to the alignment film surface. The essential constitutional units (the first constitutional unit and the second constitutional unit) of the polymer align liquid crystal molecules in the same direction (the same to such an extent that the device can be driven in VATN mode). The alignment film of the present Embodiment, which is obtain able by providing a film with an alignment treatment by photoirradiation, the film being formed from the alignment film material of the present Embodiment, can align liquid crystal molecules uniformly (to such an extent that the device can be driven in VATN mode) in the alignment film plane. Thus, the alignment film of the present Embodiment is a vertical alignment film that controls alignment of liquid crystal molecules substantially vertically to the alignment film surface. It is preferable that the alignment film controls alignment of the liquid crystal molecules in such a way that the average pretilt angle of the liquid crystal layer is 87° to 89.5°, more preferably 87.5° to 88.5°.

Each of the essential constitutional units is derived from a diamine. That is, the diamine is a monomer component of the essential constitutional units. The polymer of the present Embodiment is a copolymer obtain able by polymerizing a monomer component containing a diamine and an acid anhydride. The polymer of the present Embodiment has a main chain structure of at least one of a polyamic acid and a polyimide. Thus, the liquid crystal display device including the alignment film formed from the alignment film material of the present Embodiment can be effectively driven in VATN mode, and the average pretilt angle of the liquid crystal layer can be stably controlled to 87° to 89.5° (more preferably 87.5° to 88.5°), which is preferable in VATN mode. In addition, the AC image sticking is effectively suppressed.

The polymer of the present Embodiment is mentioned with reference to FIG. 1. FIG. 1 shows a basic structure of the polymer included in the alignment film material in accordance with the present Embodiment. In FIG. 1, the part encircled by the solid line is a unit derived from an acid anhydride (acid anhydride unit); the part encircled by the dashed line is a unit derived from a diamine for a photo-alignment film, i.e., a diamine having a side chain 21 containing a photofunctional group (photo-alignment diamine unit); and the part encircled by the dashed-dotted line is a unit derived from a diamine for a vertical alignment film, i.e., a diamine having a side chain 22 containing a vertical alignment functional group (vertical alignment diamine unit). As shown in FIG. 1, the polymer of the present Embodiment is a copolymer obtain able by polymerizing two diamines that are monomer components of the first and second constitutional units with an acid anhydride. One of the two diamines is a diamine having a side chain containing a photofunctional group and the other is a diamine having a side chain containing a vertical alignment functional group. The polymer of the present Embodiment is a polyamic acid or a polyimide constituted by acid anhydride unit and the photo-alignment diamine unit or the vertical alignment diamine unit, alternately arranged. According to a polymer for a conventional alignment film, if the alignment film is a photo-alignment film, the polymer is a polyamic acid or a polyimide constituted by an acid anhydride unit and a photo-alignment diamine unit, alternately arranged, and if the alignment film is a vertical alignment film, the polymer is a polyamic acid or a polyimide constituted by an acid anhydride unit and a photo-alignment diamine unit, alternately arranged.

The first constitutional unit contains at least one photofunctional group selected from the group consisting of a cinnamate group (the following formula (1)), a culcon group (the following formula (2)), an azobenzene group (the following formula (3)), a stilbene group (the following formula (4)), a cinnamoyl group, and a coumarin group. These photofunctional groups undergo any of a crosslinking reaction (including a dimerization reaction), isomerization, photorealignment, or a complex reaction thereof by photoirradiation, thereby exhibiting a function of aligning liquid crystal molecules that are positioned on the alignment film surface in a desired direction depending on photoirradiation conditions such as an irradiation angle. A coumarin derivative includes a compound represented by the following formula (5), for example. Particularly, it is preferable that the first constitutional unit has a side chain containing at least one photofunctional group selected from the group consisting of a cinnamate group (absorption wavelength ($\lambda$max) of 270 nm), a culcon group (absorption wavelength ($\lambda$max) of 300 nm), an azobenzene group (absorption wavelength ($\lambda$max) of 350 nm), and a stilbene group (absorption wavelength ($\lambda$max) of 295 nm). According to this, the liquid crystal display device of the present invention can be effectively driven in VATN mode, and the average pretilt angle of the liquid crystal layer can be stably controlled within 87° to 89.5° (more preferably, 87.5° to 88.5°), which is a preferable range for VATN mode. In addition, the AC image sticking is effectively suppressed. These photofunctional groups may be used singly or in combination of two or more species of them.

[Formula 1]

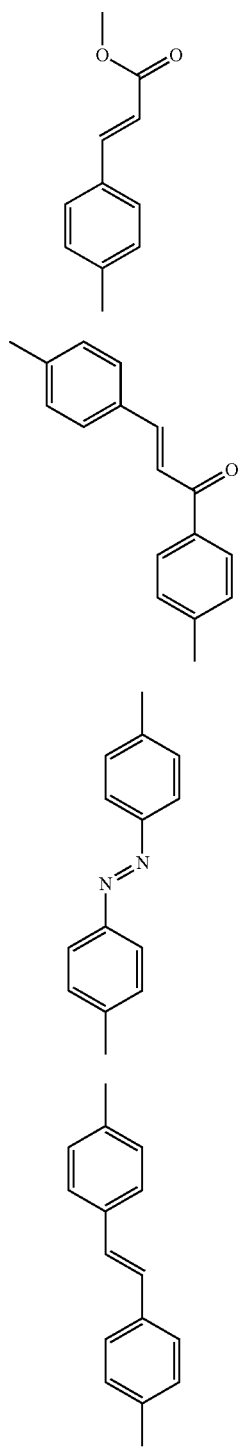

(1)

(2)

(3)

(4)

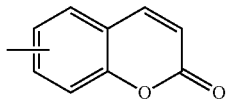

(5)

The second constitutional unit may contain a vertical functional group included in a conventional vertical alignment film. In particular, the second constitutional unit is preferably derived from a diamine represented by the following formula (7), (8), or (9). These diamines may be used singly or in combination of two or more species of them.

[Formula 2]

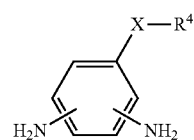

(7)

in the formula (7),
X representing a single bond, —O—, —CO—, —COO—, —OCO—, —NHCO—, —CONH—, —S—, or an arylene group; and
$R^4$ representing an alkyl group with 10 to 20 carbon atoms, a monovalent organic group having an alicyclic skeleton with 4 to 40 carbon atoms, and a fluorine atom-containing monovalent organic group with 6 to 20 carbon atoms.

[Formula 3]

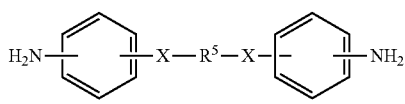

(8)

in the formula (8),
X representing a single bond, —O—, —CO—, —COO—, —OCO—, —NHCO—, —CONH—, —S—, or an arylene group; and
$R^5$ representing an alicyclic skeleton-containing divalent organic group with 4 to 40 carbon atoms.

[Formula 4]

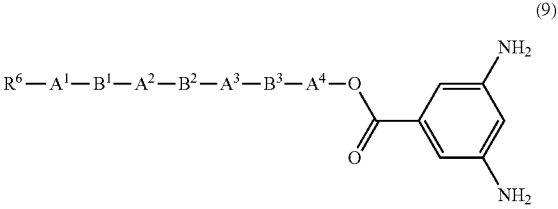

(9)

in the formula (9),
$A^1$, $A^2$, and $A^3$ being each independently 1,4-cyclohexylene or 1,4-phenylene;
$A^4$ representing 1,4-cyclohexylene, 1,4-phenylene or a single bond;
$B^1$, $B^2$, and $B^3$ being each independently a single bond or 1,2-ethylene;

$R^6$ representing an alkyl with 1 to 20 carbon atoms and one —$CH_2$— in the alkyl may be substituted with —O—.

In the formula (7), examples of the alkyl group with 10 to 20 carbon atoms, represented by $R^4$ include: an n-decyl group, an n-dodecyl group, an n-pentadecyl group, an n-hexadecyl group, an n-octadecyl group, and an n-eicosyl group.

Examples of the organic group having an alicyclic skeleton with 4 to 40 carbon atoms, represented by $R^4$ in the formula (7) and $R^5$ in the formula (8), include: a group containing an alicyclic skeleton derived from cycloalkanes such as cyclobutane, cyclopentane, cyclohexane, and cyclodecane; steroid skeleton-containing groups such as cholesterol and cholestanol; and bridged alicyclic skeleton-containing groups such as norbornene and adamantane. Among them, the steroid skeleton-containing groups are particularly preferable. The organic group having an alicyclic skeleton may be substituted with a halogen atom, preferably a fluorine atom, or a fluoroalkyl group, preferably a trifluoromethyl group.

Examples of the fluorine atom-containing group with 6 to 20 carbon atoms, represented by $R^4$ in the formula (7), include groups obtained by substituting some or all of hydrogen atoms in the following organic groups with a fluorine atom or a fluoroalkyl group such as a trifluoromethyl group. The organic groups are: straight-chain alkyl groups with 6 or more carbon atoms, such as an n-hexyl group, an n-octyl group, and an n-decyl group; alicyclic hydrocarbon groups with 6 or more of carbon atoms, such as a cyclohexyl group and a cyclooctyl group; and aromatic hydrocarbon groups with 6 or more of carbon atoms, such as a phenyl group and a biphenyl group.

Examples of X in the formulae (7) and (8) include: a single bond, —O—, —CO—, —COO—, —OCO—, —NHCO—, —CONH—, —S—, or an arylene group. Examples of the arylene group include a phenylene group, a tolylene group, a biphenylene group, a naphthylene group. Among them, —O—, —COO—, and —OCO— are still more preferable.

Specific examples of the diamine containing the group represented by the formula (7) preferably include:

dodecanoxy-2,4-diaminobenzene, pentadecanoxy-2,4-diaminobenzene, hexadecanoxy-2,4-diaminobenzene, octadecanoxy-2,4-diaminobenzene, and compounds represented by the following formulae (10) to (15).

[Formula 5]

(10)

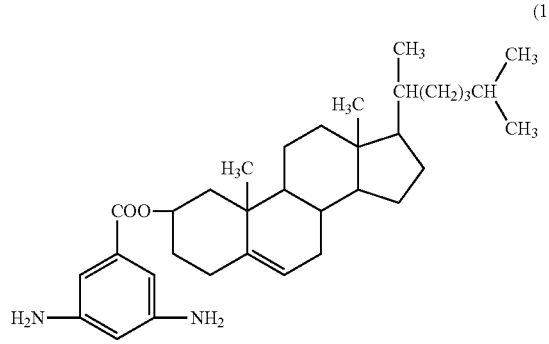

(11)

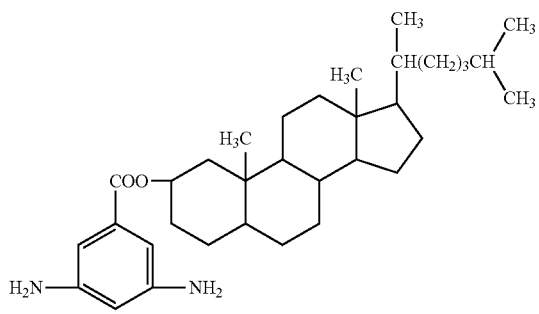

(12)

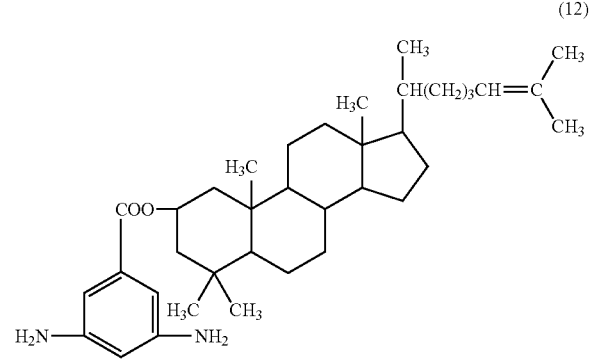

(13)

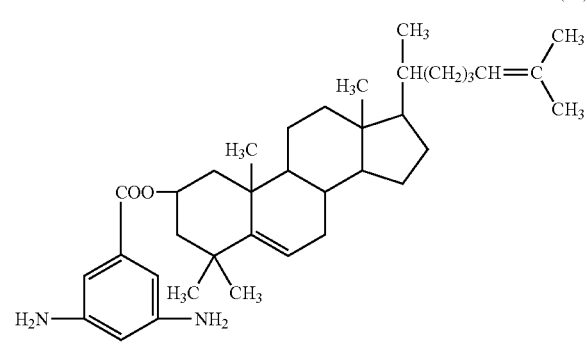

(14)

(15)

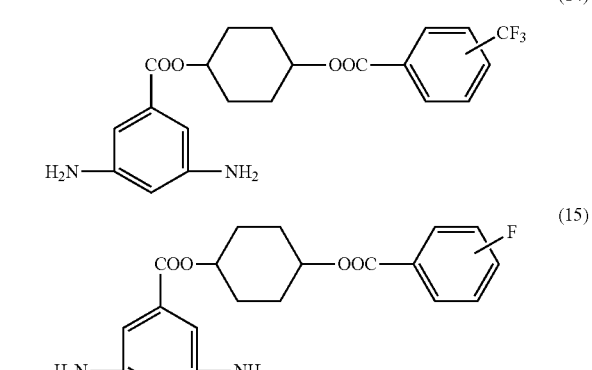

Specific examples of the diamine containing the group represented by the formula (8) preferably include: diamines represented by the following formulae (16) to (18).

[Formula 6]

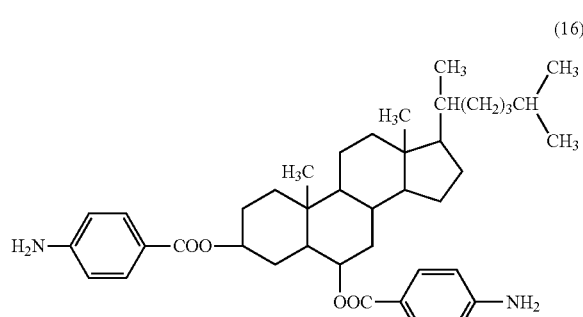

(16)

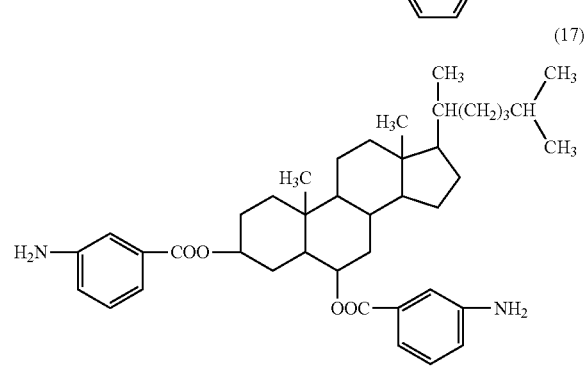

(17)

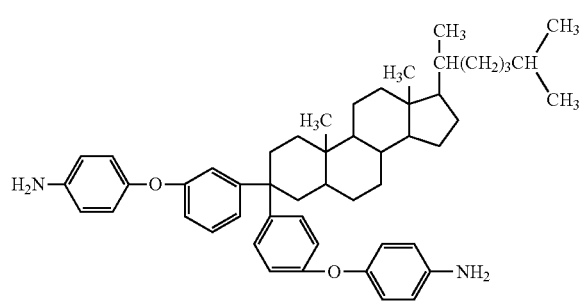

(18)

In the formula (9), $R^6$ is any straight or branched alkyl selected from alkyls with 1 to 20 carbon atoms. One —$CH_2$— in the alkyl may be substituted with —O—. Specific examples of the alkyls include: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, isopropyl, isobutyl, sec-butyl, t-butyl, isopentyl, neopentyl, t-pentyl, 1-methyl pentyl, 2-methyl pentyl, 3-methyl pentyl, 4-methyl pentyl, isohexyl, 1-ethyl pentyl, 2-ethyl pentyl, 3-ethyl pentyl, 4-ethyl pentyl, 2,4-dimethyl hexyl, 2,3,5-triethyl heptyl methoxy, ethoxy, propyl oxy, butyloxy, pentyl oxy, hexyl oxy, methoxy methyl, methoxy ethyl, methoxy propyl, methoxy butyl, methoxy pentyl, methoxyhexyl, ethoxymethyl, ethoxyethyl, ethoxypropyl, ethoxy butyl, ethoxy pentyl, ethoxy hexyl, hexyl oxymethyl, hexyl oxyethyl, hexyl oxypropyl, hexyl oxybutyl, hexyl oxypentyl, hexyl oxyhexyl. Among them, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and the like are preferably mentioned.

In the formula (9), $B^1$, $B^2$, and $B^3$ each independently represents a single bond or 1,2-ethylene. The number of 1,2-ethylene in the formula (9) is preferably 0 or 1.

In the formula (9), compounds containing some of $R^6$, $A^1$, $A^2$, $A^3$, $A^4$, $B^1$, $B^2$, and $B^3$ in a combination shown in the following Tables 1 to 3 are particularly preferable. In Tables, B represents 1,4-phenylene; Ch represents 1,4-cyclohexylene; — represents a single bond; and E represents 1,2-ethylene. Cis-1,4-cyclohexylene, trans-1,4-cyclohexylene may be mixed, and trans-1,4-cyclohexylene is preferred.

TABLE 1

| No. | $R^6$ | $A^1$ | $A^2$ | $A^3$ | $A^4$ | $B^1$ | $B^2$ | $B^3$ |
|---|---|---|---|---|---|---|---|---|
| 1 | Me | Ch | Ch | B | — | — | — | — |
| 2 | n-$C_3H_7$ | Ch | Ch | B | — | — | — | — |
| 3 | n-$C_5H_{11}$ | Ch | Ch | B | — | — | — | — |
| 4 | n-$C_7H_{15}$ | Ch | Ch | B | — | — | — | — |
| 5 | n-$C_{12}H_{25}$ | Ch | Ch | B | — | — | — | — |
| 6 | n-$C_{16}H_{32}$ | Ch | Ch | B | — | — | — | — |
| 7 | n-$C_{20}H_{41}$ | Ch | Ch | B | — | — | — | — |
| 8 | n-$C_3H_7$ | Ch | Ch | B | — | E | — | — |
| 9 | n-$C_5H_{11}$ | Ch | Ch | B | — | E | — | — |
| 10 | n-$C_7H_{15}$ | Ch | Ch | B | — | E | — | — |
| 11 | n-$C_{12}H_{25}$ | Ch | Ch | B | — | E | — | — |
| 12 | n-$C_{15}H_{31}$ | Ch | Ch | B | — | E | — | — |
| 13 | n-$C_{19}H_{39}$ | Ch | Ch | B | — | E | — | — |
| 14 | n-$C_3H_7$ | Ch | Ch | B | — | — | E | — |
| 15 | n-$C_5H_{11}$ | Ch | Ch | B | — | — | E | — |
| 16 | n-$C_7H_{15}$ | Ch | Ch | B | — | — | E | — |
| 17 | n-$C_{12}H_{25}$ | Ch | Ch | B | — | — | E | — |
| 18 | n-$C_{14}H_{29}$ | Ch | Ch | B | — | — | E | — |
| 19 | n-$C_8H_{18}O$ | Ch | Ch | B | — | — | — | — |
| 20 | n-$C_{16}H_{32}O$ | Ch | Ch | B | — | — | — | — |
| 21 | n-$C_{12}H_{25}O$ | Ch | Ch | B | — | E | — | — |
| 22 | n-$C_5H_{11}$ | Ch | B | Ch | — | — | — | — |
| 23 | n-$C_7H_{15}$ | Ch | B | Ch | — | — | — | — |
| 24 | n-$C_{12}H_{25}$ | Ch | B | Ch | — | — | — | — |

TABLE 2

| No. | $R^6$ | $A^1$ | $A^2$ | $A^3$ | $A^4$ | $B^1$ | $B^2$ | $B^3$ |
|---|---|---|---|---|---|---|---|---|
| 25 | n-$C_5H_{11}$ | B | Ch | Ch | — | — | — | — |
| 26 | n-$C_7H_{15}$ | B | Ch | Ch | — | — | — | — |
| 27 | n-$C_{12}H_{25}$ | B | Ch | Ch | — | — | — | — |
| 28 | n-$C_{20}H_{41}$ | B | Ch | Ch | — | — | — | — |
| 29 | n-$C_3H_7$ | B | Ch | Ch | — | E | — | — |
| 30 | n-$C_7H_{15}$ | B | Ch | Ch | — | E | — | — |
| 31 | n-$C_5H_{11}$ | B | Ch | Ch | — | — | E | — |
| 32 | n-$C_{18}H_{37}$ | B | Ch | Ch | — | — | E | — |
| 33 | n-$C_5H_{11}$ | Ch | B | B | — | — | — | — |
| 34 | n-$C_7H_{15}$ | Ch | B | B | — | — | — | — |
| 35 | n-$C_{12}H_{25}$ | Ch | B | B | — | — | — | — |
| 36 | n-$C_{16}H_{32}$ | Ch | B | B | — | — | — | — |
| 37 | n-$C_{20}H_{41}$ | Ch | B | B | — | — | — | — |
| 38 | n-$C_5H_{11}$ | Ch | B | B | — | E | — | — |
| 39 | n-$C_7H_{15}$ | Ch | B | B | — | E | — | — |
| 40 | n-$C_3H_7$ | B | B | Ch | — | — | — | — |
| 41 | n-$C_7H_{15}$ | B | B | Ch | — | — | — | — |
| 42 | n-$C_{12}H_{25}$ | B | B | Ch | — | — | — | — |
| 43 | n-$C_5H_{11}$ | B | B | B | — | — | — | — |
| 44 | n-$C_7H_{15}$ | B | B | B | — | — | — | — |
| 45 | n-$C_5H_{11}$ | Ch | Ch | Ch | B | — | — | — |
| 46 | n-$C_7H_{15}$ | Ch | Ch | Ch | B | — | — | — |
| 47 | n-$C_{12}H_{25}$ | Ch | Ch | Ch | B | — | — | — |
| 48 | n-$C_3H_7$ | Ch | Ch | B | B | — | — | — |

TABLE 3

| No. | $R^6$ | $A^1$ | $A^2$ | $A^3$ | $A^4$ | $B^1$ | $B^2$ | $B^3$ |
|---|---|---|---|---|---|---|---|---|
| 49 | n-$C_5H_{11}$ | Ch | Ch | B | B | — | — | — |
| 50 | n-$C_7H_{15}$ | Ch | Ch | B | B | — | — | — |
| 51 | n-$C_{14}H_{29}$ | Ch | Ch | B | B | — | — | — |
| 52 | n-$C_{20}H_{41}$ | Ch | Ch | B | B | — | — | — |
| 53 | n-$C_3H_7$ | Ch | Ch | B | B | E | — | — |
| 54 | n-$C_7H_{15}$ | Ch | Ch | B | B | E | — | — |
| 55 | n-$C_{12}H_{25}$ | Ch | Ch | B | B | E | — | — |
| 56 | n-$C_3H_7$ | Ch | Ch | B | B | — | E | — |

TABLE 3-continued

| No. | R⁶ | A¹ | A² | A³ | A⁴ | B¹ | B² | B³ |
|-----|----|----|----|----|----|----|----|-----|
| 57 | n-C₅H₁₁ | Ch | Ch | B | B | — | E | — |
| 58 | n-C₇H₁₅ | Ch | Ch | B | B | — | E | — |
| 59 | n-C₇H₁₅ | B | B | Ch | Ch | — | — | — |
| 60 | n-C₁₄H₂₉ | B | B | Ch | Ch | — | — | — |
| 61 | n-C₂₀H₄₁ | B | B | Ch | Ch | — | — | — |
| 62 | n-C₅H₁₁ | B | B | Ch | Ch | — | E | — |
| 63 | n-C₇H₁₅ | B | B | Ch | Ch | — | E | — |
| 64 | n-C₇H₁₅ | B | B | Ch | Ch | — | — | E |
| 65 | n-C₁₄H₂₉ | B | B | Ch | Ch | — | — | E |
| 66 | n-C₅H₁₁ | B | Ch | Ch | Ch | — | — | — |
| 67 | n-C₇H₁₅ | B | Ch | Ch | Ch | — | — | — |
| 68 | n-C₅H₁₁ | Ch | B | B | B | — | — | — |
| 69 | n-C₇H₁₅ | Ch | B | B | B | — | — | — |

Specific examples of the diamine containing the group represented by the formula (9) preferably include a diamine represented by the formula (19).

[Formula 7]

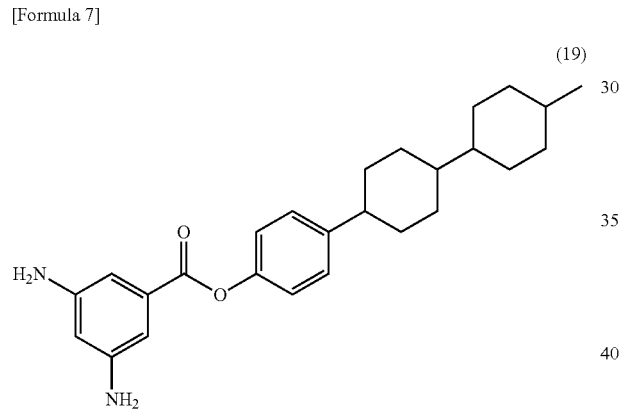

(19)

Thus, it is preferable that the second constitutional unit has a side chain having a steroid skeleton or a side chain having a structure in which three or four rings selected from 1,4-cyclohexylene and 1,4-phenylene are linearly bonded to one another directly or with 1,2-ethylene there between. Thus, the liquid crystal display device of the present invention can be effectively driven in VATN mode, and the average pretilt angle of the liquid crystal layer can be stably controlled within the range of 87° to 89.5° (preferably 87.5° to 88.5°), which is a preferable range for VATN mode. In addition, the AC image sticking is effectively suppressed.

The following acid anhydrides are preferable as the acid anhydride used for the copolymer of the present Embodiment. An acid anhydride (PMDA) represented by the formula (20), an acid anhydride (CBDA) represented by the formula (21), an acid anhydride (BPDA) represented by the formula (22), an acid anhydride (exoHDA) represented by the formula (23), an acid anhydride (BTDA) represented by the formula (24), an acid anhydride (TCA) represented by the formula (25), an acid anhydride (NDA) represented by the formula (26). These acid anhydrides may be used single or in combination of two or more species of them.

[Formula 8]

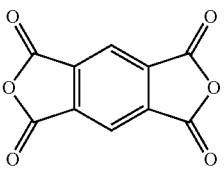

(20)

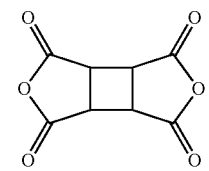

(21)

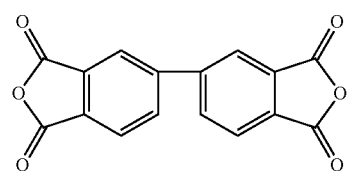

(22)

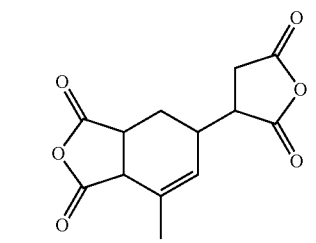

(23)

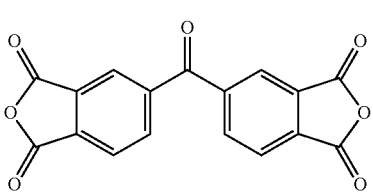

(24)

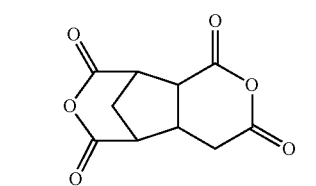

(25)

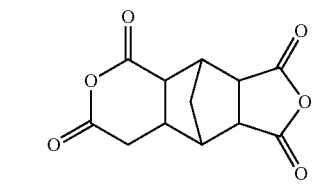

(26)

The copolymer of the present Embodiment may be a polyamide, a polyamide-imide, or a polysiloxane. That is, the copolymer of the present Embodiment may have a main chain structure of a polyamide. In this case, the copolymer of the present Embodiment can be formed by polymerizing the first and second constitutional units, with a dicarboxylic acid. The copolymer of the present Embodiment may have a main chain structure of a polysiloxane, i.e., a main chain structure containing a siloxane bond (═Si—O—Si═).

The copolymer of the present Embodiment may be constituted by the first constitutional unit containing a photofunctional group that undergoes a decomposition reaction by photoirradiation. In order to suppress a variation in pretilt angle, it is preferable that the first constitutional unit includes a photofunctional group that undergoes any one of a crosslinking reaction (including a dimerization reaction), isomerization, and photorealignment, or a complex reaction thereof by photoirradiation, as mentioned above. Polyvinyl alcohols, polyamides, and polyimides, and the like, are mentioned as an alignment film material that undergoes a photodecomposition reaction (decomposition reaction generated by light), thereby providing liquid crystals with a pretilt angle.

The reason why the AC image sticking is suppressed in a liquid crystal display device including an alignment film formed from the alignment film material of the present Embodiment is further mentioned with reference to FIGS. 2 and 3. FIG. 2 is a cross-sectional view schematically showing a vicinity of the alignment film surface in the liquid crystal display device in accordance with Embodiment 1 and explaining a mechanism for suppressing AC image sticking due to side-chain deformation. FIG. 2(a) shows an initial state. FIG. 2(b) shows a state where an electrical field is applied to the liquid crystal layer. FIG. 2(c) shows a state where the application of the electrical field to the liquid crystal layer is stopped. FIG. 3 is a cross-sectional view schematically showing a vicinity of the alignment film surface in the liquid crystal display device in accordance with Embodiment 1 and explaining a mechanism for suppressing AC image sticking cause by the liquid crystal adsorption. FIG. 3(a) shows an initial state. FIG. 3(b) shows a state where an electrical field is applied to the liquid crystal layer. FIG. 3(c) shows a state where the application of the electrical field to the liquid crystal layer is stopped.

The mechanism for suppressing AC image sticking due to side-chain deformation is mentioned below. As shown in FIG. 2(a), in the initial state, similarly to a conventional case, liquid crystal molecules 11 contained in a liquid crystal layer 20 and side chains of an alignment film 10 (a side chain 21 containing a photofunctional group and a side chain 22 containing a vertical alignment functional group) interact with each other, and the molecules 11 are pre-tilted. As shown in FIG. 2(b), when an electrical field is applied to the liquid crystal layer 20, the side chain 22 containing a vertical alignment functional group suppresses the side chain 21 containing a photofunctional group from being inclined by bending deformation of the molecules 11 (suppression of elastic deformation, steric hindrance). As shown in FIG. 2(c), when the application of the electrical field to the liquid crystal layer 20 is stopped, the side chains of the alignment film 10 are hardly inclined. As a result, it is considered that a change in the tilt angle of the liquid crystal layer 20 could be suppressed, which results in suppression of the AC image sticking.

The mechanism for suppressing AC image sticking due to liquid crystal adsorption is mentioned below. Even if light such as UV light is radiated to the alignment film 10, a portion where the liquid crystal molecules 11 adsorb to a main chain 25 is decreased as shown in FIG. 3(a) in the initial state, due to steric hindrance of the side chain 22 containing a vertical alignment functional group. As shown in FIG. 3(b), also when an electrical field is applied to the liquid crystal layer 20, steric hindrance of the side chain 22 containing a vertical alignment functional group suppresses the liquid crystal molecules 11 from passing through the side chains of the alignment film 10 (the side chain 21 containing a photofunctional group and the side chain 22 containing a vertical alignment functional group) and then aligning with the adsorbing liquid crystal molecules (the liquid crystal molecules that have adsorbed to the main chain since the initial state). Thus, generation of the liquid crystal molecules that adsorb between the main chains and of the liquid crystal molecules that align with the absorbing liquid crystal molecules can be suppressed. As a result, it is considered that when the application of the electric field to the liquid crystal layer 20 is stopped, a change in the tilt angle of the liquid crystal layer 20 could be suppressed as shown in FIG. 3(c), which results in suppression of the AC image sticking.

Compared with conventional photo-alignment films, an improvement in coating properties of the alignment film material of the present Embodiment when the material is printed by spin coating, flexography, ink-jet printing, and the like can be expected. If the above-mentioned photo-alignment diamine unit contains a fluorine atom at an end of its side chain with the aim of improving a VHR, the unit shows high hydrophobicity. That is, a homopolymer of a conventional photo-alignment diamine unit commonly exhibits insufficient coating properties for a substrate. In contrast, the copolymer of the present Embodiment, obtained by copolymerizing the photo-alignment diamine unit and the vertical alignment diamine unit, contains the photo-alignment diamine unit in a smaller amount, and so a proportion of the fluorine in the polymer can be decreased. In addition, the vertical alignment diamine unit generally has lower hydrophobicity than that of fluorine. Accordingly, the coating properties for a substrate can be more improved as the introduction ratio of the vertical alignment diamine unit is increased.

The present invention can be applied to horizontal alignment mode such as TN, ECB, and IPS mode. In this case, the AC image sticking can be suppressed using a horizontal alignment film that includes a copolymer of an imide derivative, an amide derivative, and the like, containing a photofunctional group with an imide derivative, an amide derivative, and the like, not containing a photofunctional group.

2. Preparation Method of Alignment Film

A preparation method of the alignment film of the present Embodiment is mentioned below.

First, the monomer components of the first and second constitutional units are copolymerized with an acid anhydride by a publicly known method.

A varnish for applying (printing) the polymer to a substrate is prepared. The varnish preferably includes a mixed solvent containing solvents such as γ-butyl lactone (BL), N-methylpyrrolidone (NMP), butyl cellosolve (BC), diethyl ether dibutyl glycol (DEDG), diisobutyl ketone (DIBK), and dipentyl ether (DPE).

The varnish is applied to a substrate. Spin coating, flexography, ink-jet printing, and the like, are preferable for the application.

After being printed on the substrate, the varnish is pre-baked with a hot plate for pre-baking and then post-baked with a hot plate for post-baking. In the pre-baking and post-baking, the temperature and heating time may be appropriately determined. The thickness of the alignment film of the present Embodiment may be appropriately determined.

The alignment film of the present Embodiment may be formed by a so-called two-layered treatment or hybrid treatment. A residual DC has been thought to be a main cause of the image sticking in liquid crystal devices. An increase in thickness (volume) of an alignment film contributes to an increase in the residual DC. So a decrease in thickness (volume) of an alignment film leads to a decrease in the residual DC. In order to prevent coating defects in a step of printing an alignment film in a panel production, the alignment film needs to keep a certain thickness, e.g., 60 nm or more. In view of these circumstances, a so-called two-layered treatment or hybrid treatment can be employed. If a varnish containing a polymer for a horizontal alignment film and a polymer for a vertical alignment film in a specific ratio (for example, 50:50 to 10:90) is applied to a substrate, phase separation occurs between the two polymers immediate after the varnish coating or in the process of baking the applied alignment film. By utilizing this action, the horizontal alignment film is formed on the substrate side and the vertical alignment film is formed on the liquid crystal layer side. As a result, the volume of the alignment film exposing on the liquid crystal layer side is decreased, and the residual DC and the image sticking due to the residual DC can be reduced. Also in the present Embodiment, the above-mentioned treatment may be employed, if necessarily. Thus, a liquid crystal display device in which both of the image sticking due to the residual DC and the image sticking in AC mode less occur can be provided.

Next, the alignment film formed on the substrate is provided with an alignment treatment by photoirradiation. Conditions of the irradiation to the alignment film may be appropriately determined. It is preferable that the alignment film is irradiated with light including UV light, and it is more preferable that the alignment film is irradiated with UV light. In order to shorten a tact time in the production process, the alignment film is irradiated with light at an exposure energy of 100 mJ/cm$^2$ or less, and more preferably 50 mJ/cm$^2$ or less. If the alignment film is provided with an alignment treatment by compartmentalizing each pixel region into some regions and separately exposing the regions through a light-shielding mask (photomask) and the like, it is preferable that the alignment film is irradiated with light at an exposure energy of 20 mJ/cm$^2$ or less. Other irradiation conditions (for example, existence of polarized light, irradiation angle) may be appropriately determined.

Thus, the alignment film of the present Embodiment is formed and provided with the alignment treatment. As a result, the alignment film of the present Embodiment has a structure derived from a photofunctional group, preferably at least one structure selected from the group consisting of a photofunctional group-bonding structure, a photoisomerization structure, and a photo-alignment structure. Further, the alignment film provides liquid crystal molecules with a substantially uniform pretilt angle in the alignment film plane.

3. Basic Operation of Liquid Crystal Display Device

The basic operation of the liquid crystal display device of the present Embodiment is mentioned below.

FIG. 4 is a perspective view schematically showing a relationship between a photo-alignment treatment direction and a pretilt direction of a liquid crystal molecule in accordance with Embodiment 1. FIG. 5(a) is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device. FIG. 5(b) is a schematic view showing directions of absorption axes of polarization plates arranged in the liquid crystal display device shown in FIG. 5(a). FIG. 5(a) shows a state where the photo-alignment treatment directions are perpendicular to each other between a pair of substrates and an AC voltage not lower than a threshold voltage is applied between the pair of substrates. In FIG. 5(a), the solid arrow shows a direction of photo-irradiation (a direction of photo-alignment treatment) for a lower substrate; and the dotted arrow shows a direction of photo-irradiation (a direction of photo-alignment treatment) for an upper substrate.

FIG. 6 is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device. FIG. 6(a) is a plan view schematically showing a director alignment of liquid crystal in one pixel (one sub-pixel); and directions of photo-alignment treatment for a pair of substrates in the case that the liquid crystal display device in Embodiment 1 is a mono-domain device. FIG. 6(b) is a schematic view showing directions of absorption axes of polarization plates arranged in the liquid crystal display device shown in FIG. 6(a). FIG. 6(a) shows a state where photo-alignment treatment directions are parallel and opposite to each other between the pair of substrates and an AC voltage not lower than a threshold voltage is applied between the pair of substrates. In FIG. 6(a), the solid arrow shows a direction of photoirradiation (a direction of photo-alignment treatment) for a lower substrate; and the dotted arrow shows a direction of photoirradiation (a direction of photo-alignment treatment) for an upper substrate. FIG. 7 is a cross-sectional view schematically showing a first arrangement relationship between substrates and a photomask in a photo-alignment treatment process in accordance with Embodiment 1 where alignment division is performed by proximity exposure using an alignment mask. FIG. 8 is a cross-sectional view schematically showing a second arrangement relationship between substrates and a photomask in a photo-alignment treatment process in accordance with Embodiment 1 where alignment division is performed by proximity exposure using an alignment mask. FIG. 9(a) is a plan view schematically showing: the average director alignment of liquid crystal in one pixel (one sub-pixel); directions of photo-alignment treatment for a pair of substrates (upper and lower substrates); and a arrangement pattern of a multi-domain, in the case that the liquid crystal display device in Embodiment 1 is a four-domain device. FIG. 9(b) is a schematic view showing directions of absorption axes of polarization plates in the liquid crystal display device shown in FIG. 9(a). FIG. 9(a) shows a state where an AC voltage not lower than a threshold voltage is applied between the pair of substrates. In FIG. 9(a), the solid arrow shows a direction of photoirradiation (a direction of photo-alignment treatment) to a lower substrate (driving element substrate); and the dotted arrow shows a direction of photoirradiation (a direction of photo-alignment treatment) to an upper substrate (color filter substrate).

The operation principle of the liquid crystal display device of the present Embodiment is mentioned with reference to FIGS. 4 to 9.

According to the liquid crystal display device of the present Embodiment, a liquid crystal layer containing liquid crystal molecules with negative dielectric anisotropy is interposed between a pair of substrates (upper and lower substrates). Each of the pair of substrates includes an insulating transparent substrate such as a glass substrate. On a liquid crystal layer side-surface of each substrate, a transparent electrode is formed. On the transparent electrode, the above-mentioned vertical alignment film is formed. One of the pair of substrates functions as a driving element substrate (for example, TFT substrate) having a driving element (a switching element) formed in every pixel (every sub-pixel). The other functions as a color filter substrate having a color filter formed to face each pixel (each sub-pixel) of the driving element substrate. That is, in the liquid crystal display device of the present Embodiment, one of the pair of substrates (upper and lower substrates) is a color filter substrate and the other is a driving element substrate. In the driving element substrate, the transparent electrode that is connected to the driving element and arranged in a matrix pattern functions as a pixel electrode. In the color filter substrate, the transparent electrode that is uniformly formed over the entire display region functions as a counter electrode (common electrode). Polarization plates are each arranged on a surface on the side opposite to the liquid crystal layer side of each substrate in a Cross-Nicol state for example. Between the pair of substrates, a cell gap controlling member (spacer) for controlling a constant cell gap is arranged at a specific position (in non-display region). The material for the substrates, the transparent electrodes, and the liquid crystal molecules, and the like, are not especially limited.

As shown in FIG. 4, the alignment film 10 provides liquid crystal molecules 11 with a pretilt angle in an UV-irradiation direction if being irradiated with UV light polarized parallel to an incident face (shown by the outline arrow in FIG. 4), for example, from a direction making an angle of 40° with the normal direction of the substrate face. The alignment film 10 may be exposed by shot exposure or scanning exposure. That is, the alignment film 10 may be irradiated with UV light with the substrate and a light source being fixed. As shown in the dotted arrow in FIG. 4, the alignment film 10 may be irradiated with UV light by being scanning with UV light in the UV scanning direction.

In the liquid crystal display device of the present Embodiment, exposure for the alignment films and attachment of the pair of substrates (upper and lower substrates 12) may be performed so that a direction of photoirradiation to one of the pair of substrates is substantially perpendicular to a direction of photoirradiation to the other substrate when the pair of substrates are viewed in plane as shown in FIG. 5(a). Liquid crystal molecules near the alignment films arranged on the upper and lower substrates 12 may have substantially the same pretilt angle. Liquid crystal materials free from a chiral material may be injected between the substrates as a liquid crystal layer. In this case, by applying an AC voltage not less than a threshold voltage value between the upper and lower substrates 12, liquid crystal molecules twist 90° in the normal direction of the substrate plane between the upper and lower substrates 12, and as shown in FIG. 5, the average liquid crystal director alignment 17 under AC voltage application is in a direction bisecting an angle made by the directions of photoirradiation to the upper and lower substrates 12 when the substrates are viewed in plane. As shown in FIG. 5(b), a direction of an absorption axis of a polarization plate (upper polarization plate) arranged on the upper substrate side is the same as a direction of photoirradiation to the upper substrate, and a direction of an absorption axis of the other polarization plate (lower polarization plate) arranged on the lower substrate side is the same as a direction of photoirradiation to the lower substrate. The liquid crystal display device of the present invention, produced through the above-mentioned alignment treatment for the alignment films and arrangement of the polarization plates, is a so-called VATN device.

In the liquid crystal display device of the present Embodiment, exposure for the alignment films and attachment of the substrates may be performed so that directions of photoirradiation to the upper and lower substrates 12 are substantially parallel and opposite to each other when the substrates are viewed in plane, as shown in FIG. 6(a). Liquid crystal molecules near the alignment films arranged on the upper and lower substrates 12 may have substantially the same pretilt angle. Liquid crystal materials free from a chiral material may be injected between the substrates as a liquid crystal layer. In this case, when no voltage is applied between the upper and lower substrates 12, liquid crystal molecules near the interface between the liquid crystal layer and the upper and lower substrates 12 have a homogeneous structure (homogeneous alignment) where the liquid crystal molecules have a pretilt angle of about 88.5°. As shown in FIG. 6(a), the average liquid crystal director alignment 17 under AC voltage application is in the direction of photoirradiation to the upper and lower substrates 12 when the substrates are viewed in plane. As shown in FIG. 6(b), directions of absorption axes of the polarization plates (upper and lower polarization plates) arranged on the upper and lower substrates are different from directions of photo-alignment treatment for the upper and lower substrates by 45° when the substrates are viewed in plane. The liquid crystal display device of the present invention, produced through the above-mentioned alignment treatment for the alignment films and arrangement of the polarization plates, is a so-called VAECB (vertical alignment electrically controlled birefringence) device where the directions of photoirradiation to the upper and lower substrates are opposite and parallel to each other and liquid crystal molecules are vertically aligned. In FIG. 6, the solid arrow shows a direction of photo-irradiation (a direction of photo-alignment treatment) to the lower substrate, and the dotted arrow shows a direction of photo-irradiation (a direction of photo-alignment treatment) to the upper substrate.

The case that the liquid crystal display device in accordance with the present Embodiment includes multi-domain pixels is mentioned below with reference to FIG. 9. In order to divide each pixel into four domains, the liquid crystal display device of the present Embodiment is subjected to the following exposure step. Using a photomask 13 including light-shielding parts 14 each having a width that is a half width of one pixel (one sub-pixel), as shown in FIG. 7, a region corresponding to a half region of one pixel (one sub-pixel) is exposed in one direction (in FIG. 7, a direction from the front side to the back side of the paper) and simultaneously the rest half region is light-shielded by the light-shielding part 14, first. Then, as shown in FIG. 8, the photomask 13 is shifted by a half pitch of the pixel (one sub-pixel), and then, the region that has been exposed is light-shielded through the light-shielding part 14 and a region which has not been light-shielded (an unexposed region in the step shown in FIG. 7) is exposed in the direction opposite to the direction shown in FIG. 7 (in FIG. 8, a direction from the back side to the front side of the paper). As a result, one pixel (one sub-pixel) is divided into two regions with the same width, where liquid crystal molecules in one region and liquid crystal molecules in the other region are pre-tilted in two mutually opposite directions. Such two regions are arrayed in a stripe pattern.

As mentioned above, each pixel (each sub-pixel) on each substrate is divided into two domains by alignment division in such a way that the domains are arranged at a regular pitch. Then, the both substrates are arranged (attached) so that the division directions (photo-alignment treatment directions) are perpendicular to each other between the upper and lower substrates 12, and then, liquid crystal materials free from a chiral material are injected into the liquid crystal layer. As a result, as shown in FIG. 9(a), four domains where the alignment directions of liquid crystal molecules that are positioned near the center in the thickness direction of the liquid crystal layer are different, more specifically, substantially perpendicular to each other, among the four directions (FIG. 9(a), i to iv) can be formed. That is, the average liquid crystal director alignment 17 under the AC voltage application bisects an angle made by the directions of photoirradiation to the upper and lower substrates 12 in each domain when the substrates are viewed in plane. The direction of photo-alignment treatment for the upper substrate (color filter substrate) (in FIG.

9(*a*), the direction shown by the dotted arrow) is the same as an absorption axis direction 16 of a polarization plate arranged on the upper substrate side, and the direction of photo-alignment treatment for the lower substrate (driving element substrate) (in FIG. 9(*a*), the direction shown by the solid arrow) is the same as an absorption axis direction 15 of a polarization plate arranged on the lower substrate side when the substrates are viewed in plane.

In each domain boundary, liquid crystal molecules on one of the pair of substrates align in the same direction as an absorption axis direction of the polarizing plate, and liquid crystal molecules on the other substrate align almost perpendicular to the substrate. Accordingly, when the polarization plates are arranged in a Cross-Nicol state, the domain boundary does not transmit light even when a voltage is applied between the substrates, and as a result, the boundary is observed as a dark line.

In this domain boundary, a photo-alignment film is redundantly exposed, generally. So in such a redundantly exposed-part (doubly-exposed part), a conventional photo-alignment film does not provide a uniform pretilt angle. In the doubly-exposed part of the conventional photo-alignment film, the number of exposure treatment is asymmetry, and thereby AC image sticking tends to be increased. However, use of the alignment film of the present Embodiment effectively suppresses the AC image sticking in the doubly-exposed part and variation in the pretilt angle of liquid crystal molecules in the doubly-exposure part.

As mentioned above, the liquid crystal display device of the present Embodiment can show excellent viewing angle characteristics, that is, a wide viewing angle if having four domains where the alignment directions of liquid crystal molecules are different from (substantially perpendicular to) one another.

The layout of the domains in the liquid crystal display device of the present Embodiment is not limited to that (division into four) shown in FIG. 9(*a*) and it may be a layout shown in FIG. 10(*a*). FIG. 10(*a*) is a plan view schematically showing: the average director alignment of liquid crystal in one pixel (one sub-pixel); directions of photo-alignment treatment for a pair of substrates (upper and lower substrates); and a pattern of a multi-domain, in the case that the liquid crystal display device in Embodiment 1 has four domain different from that in FIG. 9(*a*).

FIG. 10(*b*) is a schematic view showing directions of absorption axes of polarization plates in the liquid crystal display device shown in FIG. 10(*a*). FIG. 10(*c*) is a schematic cross-sectional view taken along line A-B in FIG. 10(*a*), and shows alignment directions of liquid crystal molecules when an AC voltage not lower than a threshold voltage is applied between the pair of substrates. In FIG. 10(*a*), the dotted arrow shows a direction of photoirradiation (a direction of photo-alignment treatment) to a lower substrate (driving element substrate); and the solid line shows a direction of photoirradiation (a direction of photo-alignment treatment) to an upper substrate (color filter substrate).

In FIG. 10(*c*), the dotted line shows a domain boundary.

The domains of this Embodiment are formed in the following procedures. As shown in FIG. 10(*a*), each pixel (each sub-pixel) on each of a pair of substrates is divided into two domains by alignment division in such a way that the domains are arranged at a regular pitch. As shown in FIG. 10(*a*), the both substrates are arranged (attached to each other) in such a way that when the substrates are viewed in plane, the divisional directions (photo-alignment treatment directions) are perpendicular to each other between the upper and lower substrates 12 and that the upper substrate is shifted by a quarter of a pixel pitch in the direction shown by the dotted arrow in FIG. 10(*a*). As a result, as shown in FIG. 10(*a*), four domains (in FIG. 10(*a*), i to iv) where the alignment directions of liquid crystal molecules that are positioned near the center in the thickness direction of the liquid crystal layer are different depending on the domain, more specifically, substantially perpendicular to each other can be formed. That is, as shown in FIG. 10(*a*) the average liquid crystal director alignment 17 under the AC voltage application bisects an angle made by the directions of photoirradiation to the upper and lower substrates 12. As shown in FIG. 10(*b*), in this Embodiment, when the substrates are viewed in plane, the direction of photo-alignment treatment (in FIG. 10, the direction shown by the solid arrow) for the upper substrate (color filter substrate) is the same as the absorption axis direction 16 of the polarization plate arranged on the upper substrate side, and the direction of photo-alignment treatment (in FIG. 10, the direction shown by the dotted arrow) for the lower substrate (driving element substrate) is the same as the absorption axis direction 15 of the polarization plate arranged on the lower substrate side. When no voltage is applied between the upper and lower substrates, the liquid crystal molecules align substantially vertically to the upper and lower substrates attributed to alignment regulating force of the alignment film. When a voltage not lower than a threshold voltage is applied between the upper and lower substrates, the liquid crystal molecules 11 twist almost 90° between the upper and lower substrates and align in directions different depending on the four domains.

4. Production Method of Liquid Crystal Display Device

The production method of the liquid crystal display device in accordance with the present Embodiment is mentioned below.

First, a pair of substrates on which an alignment film is not arranged is produced by a common method.

A driving element substrate is produced as one of the pair of substrates as follows: (1) scanning signal lines, (2) driving elements, such as a TFT, (3) data signal lines, and (4) pixel electrodes, which are transparent electrodes, are successively formed on a glass substrate. The scanning signal lines and the data signal lines are arranged in a matrix pattern to intersect with each other on the substrate. An insulating film is arranged between the scanning signal lines and the data signal lines. The driving element and the pixel electrode are arranged at each intersection of the scanning signal lines with the data signal lines. Components in the driving element substrate may be formed from a material commonly used.

A color filter substrate (CF substrate) is produced as the other substrate of the pair of substrates as follows: (1) a black matrix (BM), (2) color filters, (3) a protective film, and (4) common electrodes, which are transparent electrodes, are successively formed on a glass substrate. The BM is arranged in a lattice pattern, and the color filter is arranged in each region surrounded by the BM. Components in the CF substrate may be formed from materials commonly used.

Then an alignment film-forming step is performed. This is mentioned in detail above in 1. the alignment film material and 2. preparation method of alignment film. So a specific example thereof is mentioned below. A varnish is prepared from the copolymer of an imide derivative, an amide derivative, and the like, containing the above-mentioned photofunctional group with an imide derivative, an amide derivative, and the like, containing no photofunctional group. After being printed on a substrate, the varnish is pre-baked on a hot plate for pre-baking at 90° C. for 1 minute and then post-baked on a hot plate for post-baking at 200° C. for 60 minutes.

The varnish is printed on the substrate to give an alignment film with a thickness of 100 nm after the baking. After being cooled to room temperatures, the substrate is irradiated with P-polarized UV light with a polarization degree of 10:1 at an exposure energy of 20 mJ/cm$^2$ from a direction making an angle of 40° with respect to the normal direction of the substrate surface. In such a manner, the alignment film in accordance with the present Embodiment is formed. The alignment treatment for the alignment film (the alignment film-exposing step) may be performed after the below-mentioned spacer-arranging step.

Then the spacer-arranging step is performed. A cell gap-controlling member such as plastic beads (product of SEKISUI FINE CHEMICAL CO., LTD., trade name: Micropearl, 3.5 μm in diameter) in a desired amount (density: four to five beads per 100 μm$^2$) is dry-sprayed. The spacer may be arranged by ink-jet printing, i.e., by printing an ink containing the cell gap controlling member (adhesive beads) at a desired position. If necessary, the substrate may be heated at a predetermined temperature (for example, about 100 to 200° C.) in order to sufficiently fix the adhesive beads to the substrate. In addition, the spacer may be arranged by forming a photo spacer at a predetermined position using a photosensitive resin material before forming the alignment film.

Then a sealing member-arranging step is performed. A sealing member is applied to the substrate including no spacers. The sealing member is preferably applied by screen printing or with a dispenser. STRUCT BOND XN-21S, a product of Mitsui Chemicals, Inc., a photo thermal sealing agent, product of Kyoritsu Chemical & co., ltd., and the like, may be preferably used as the sealing member, for example.

Then a liquid crystal material-injecting step is performed. Vacuum injection or a drop-and-fill process is preferably used for injecting the liquid crystal material. If the vacuum injection is employed, a photocuring bond produced by ThreeBond Co., Ltd. or SEKISUI CHEMICAL CO., LTD., is preferable as the sealing agent.

Like a conventional method, a polarization plate-attaching step, and a module-producing step are performed, and as a result, the liquid crystal display device of the present Embodiment can be completed.

5. AC Image Sticking Evaluation Test

A mono-domain VATN liquid crystal display device shown in FIG. 5 was produced and subjected to an AC image sticking evaluation test. Results of the test are mentioned below. The characteristics of AC image sticking (AC characteristics) were evaluated based on characteristics depending on an introduction ratio of an imide derivative, an amide derivative, and the like, containing a vertical alignment functional group and not having a photofunctional group relative to an imide derivative, an amide derivative, and the like, containing a photofunctional group. The liquid crystal device included an ITO electrode-including substrate where an ITO transparent electrode was divided into two (electrodes 18a and 18b) as shown in FIG. 11.

Polymers (polyimides or polyamides) with introduction ratios (% by weight) of 0%, 8%, 15%, 25%, 40%, and 50%, respectively, were prepared, the ratios being a vertical alignment diamine unit not containing a photofunctional group relative to a photo-alignment diamine unit. A monomer of the photo-alignment diamine unit was selected from the photofunctional group-containing compounds represented by the above formulae (1) to (4). A monomer of the vertical alignment diamine unit was selected from the compounds represented by the above-mentioned formulae (10) to (19). An acid anhydride was selected from the compounds represented by the above-mentioned formulae (20) to (26).

Then a varnish was prepared from the above-mentioned solvent for printing and applied on the ITO electrode-including substrate through a printing step by ink-jet printing or with a drum roll-coating. Then the ITO electrode-including substrate to which the varnish had been applied was pre-baked at 90° C. for one minute with a hot plate for pre-baking. After the pre-baking, the alignment film had a thickness of about 100 nm. Then the substrate was post-baked at 200° C. for 40 minutes with a hot plate for post-baking.

Then an ink containing the cell gap controlling member (dispersion liquid) was applied to a predetermined position (a light-shielding part in a non-display region) by ink-jet printing and dried at a room temperature of 24° C. to arrange the cell gap controlling member on the ITO electrode-including substrate.

After being cooled to room temperature, the ITO electrode-including substrate including the cell gap controlling member was provided with a photo-alignment treatment by being irradiated with (exposed to) UV light. More specifically, the substrate was irradiated with P-polarized UV light with a polarization degree of 10:1 at an exposure energy of 20 mJ/cm$^2$ from a direction making an angle of 40° with respect to the normal direction of the substrate surface.

Then the sealing member was printed on the other substrate, and the both substrates were attached to each other. The cell gap between the substrates was 3.5 μm. Then under heating at 60° C., liquid crystal materials with negative dielectric anisotropy (product of Merck KGaA, MLC6610, Δn: 0.09, Δ∈: −2.4, Tni: 90° C.) were injected between the substrates, which had undergone the above-mentioned steps, and sealed. Then as a realignment treatment step, the liquid crystal display device was heated by being kept in an oven at 130° C. for 30 minutes, and then the device was rapidly cooled to a room temperature of 24° C. at a rate of about 4° C./min. The average pretilt angle of the liquid crystal layer was about 88.5° to 89.5°. In the liquid crystal display device, two polarization plates (an upper polarization plate 23a and a lower polarization plate 23b) were attached in such a way that their absorption axes are in a cross-Nicol state.

The evaluation method of AC characteristics is mentioned.

The first photographing was performed as follows.

In an initial state (before application of an AC voltage (30 Hz, 7V)), an AC voltage (30 Hz) was applied to the electrodes 18a and 18b of the liquid crystal display device prepared as mentioned above. With increasing the voltage by 0.05V from 2.15V to 2.5V, images (display state) which were displayed by a liquid crystal display device 19 at each voltage were taken with a digital camera (product of Canon Inc., trade name: Eos Kiss Digital N) 24 that was located 40 cm away. In this evaluation test, the AC voltage was applied to the electrodes with a signal generator (product of Iwatsu Electric Co., Ltd., SG-4115).

The second photographing was performed as follows.

An AC voltage (30 Hz, 7V) kept being applied to only the electrode 18b for a certain period of time (x) as shown in FIG. 12, and then an AC voltage (30 Hz) was applied to the electrodes 18a and 18b. Similarly to the first photographing, with increasing the voltage by 0.05V from 2.15V to 2.5V, images at each voltage were taken. The time x was varied, and the second photographing was repeatedly performed. The voltage of 2.15V to 2.5V (which was applied by 0.05V) was applied only during the second photographing, just for about 1 minute. Accordingly, this time was much shorter than the time x. The taken images were analyzed in the following procedures (I) to (III). An image-processing software (product of Media Cybernetics, Inc., Image-Pro Plus) was used for the analysis.

(I) With respect to the images that were taken in the second photographing after 40 hours' voltage application, i.e., when x=40, ratios between a luminance of the electrode 18b and a luminance of the electrode 18a (a luminance of the electrode 18b)÷(a luminance of the electrode 18a) when the respective voltages were applied (by 0.05V from 2.15V to 2.5V) were calculated. Then a voltage at which the ratio shows the maximum value, that is, a voltage corresponding to the maximum luminance ratio (ΔT) was determined.

(II) With respect to images that were taken when the voltage corresponding to the maximum luminance ratio, determined in (I), was applied among the images taken in the first and second photographing, a luminance ratio (a luminance of the electrode 18b)÷(a luminance of the electrode 18a) was calculated, and the maximum luminance ratio (ΔT) at each AC voltage (30 Hz, 7V) holding time, i.e., at each time x, was determined.

(III) The time (x) during the AC voltage (30 Hz, 7V) application was plotted along the x-axis and the maximum luminance ratio (ΔT) at each time x, determined in the above (II), was plotted along the y-axis.

Before and after the AC voltage (30 Hz, 7V), a DC off-set value when a voltage of 2.3V to 2.4 V was applied was determined to be almost 0. Accordingly, this ΔT evaluation shows that the image sticking was caused by only the influences in AC mode, not in DC mode.

The evaluation results of the AC characteristics are mentioned below. FIG. 15 is a graph showing ΔT characteristics of an evaluation cell (liquid crystal display device) including an alignment film with an introduction ratio (% by weight) of a vertical alignment diamine unit not containing a photofunctional group to a photo-alignment diamine unit of 0%. Similarly to FIG. 14, FIGS. 16 to 20 are graphs showing ΔT characteristics at introduction ratios of 8% (FIG. 16), 15% (FIG. 17), 25% (FIG. 18), 40% (FIG. 19), and 50% (FIG. 20), respectively. In FIGS. 15 to 20, a plurality of graphs are plotted and show ΔT characteristics of a plurality of evaluation cells that are produced using the same materials under the same conductions. FIG. 21 shows a graph showing ΔT characteristics after 40 hour's AC voltage application to the evaluation cells with introduction ratios of 0%, 15%, 25%, 40%, and 50%. In FIG. 21, the rhombic marker (♦) shows the average value and the range (I) partitioned by the line segment shows a range from the largest value and the smallest value.

This evaluation results show that the ΔT characteristics are more improved and the AC image sticking is more suppressed as the introduction ratio of the vertical alignment diamine unit not containing a photofunctional group to the photo-alignment diamine unit is increased. Although not shown in drawings, it was determined that the ΔT was about 1.08 when the introduction ratio was 4%. Thus, it was shown that when the introduction ratio was 4% to 40%, the ΔT was reduced to 1.08 or less and the AC image sticking could be more effectively suppressed. It was also shown that when the introduction ratio was 15% to 40%, the ΔT was reduced to 1.06 or less and the AC image sticking could be particularly effectively suppressed. The average pretilt angle of the liquid crystal layer was 88.3° in the liquid crystal layer when the introduction ratio was 0%; the angle was 88.5° at 4%; the angle was 88.8° at 8%; the angle was 89.2° at 15%; and the angle was 89.5° at 40%. Thus, the higher the introduction ratio is, the larger the average pretilt angle of the liquid crystal layer tends to be.

The present application claims priority to Patent Application No. 2007-80289 filed in Japan on Mar. 26, 2007 under the Paris Convention and provisions of national law in a designated State, the entire contents of which are hereby incorporated by reference.

BRIEF DESCRIPTION OF DRAWINGS

In FIG. 1, the part encircled by the solid line is a unit derived from an acid anhydride (acid anhydride unit); the part encircled by the dashed line is a unit derived from a diamine having a side chain containing a photofunctional group (photo-alignment diamine unit); and the part encircled by the dashed-dotted line is a unit derived from a diamine having a side chain containing a vertical alignment functional group (vertical alignment diamine unit).

FIG. 2(a) shows an initial state.

FIG. 2(b) shows a state where an electrical field is applied to the liquid crystal layer.

FIG. 2(c) shows a state where the application of the electrical field to the liquid crystal layer is stopped.

FIG. 3(a) shows an initial state.

FIG. 3(b) shows a state where an electrical field is applied to the liquid crystal layer.

FIG. 3(c) shows a state where the application of the electrical field to the liquid crystal layer is stopped.

FIG. 5(a) is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device.

FIG. 5(b) is a schematic view showing directions of absorption axes of polarization plates arranged in the liquid crystal display device shown in FIG. 5(a).

In FIG. 5(a), the solid arrow shows a direction of photo-irradiation (a direction of photo-alignment treatment) for a lower substrate; and the dotted arrow shows a direction of photo-irradiation (a direction of photo-alignment treatment) for an upper substrate.

FIG. 6(a) shows a state where photo-alignment treatment directions are parallel and opposite to each other between the pair of substrates and an AC voltage not lower than a threshold voltage is applied between the pair of substrates.

In FIG. 6(a), the solid arrow shows a direction of photo-irradiation (a direction of photo-alignment treatment) for a lower substrate; and the dotted arrow shows a direction of photo-irradiation (a direction of photo-alignment treatment) for an upper substrate.

FIG. 9(b) is a schematic view showing directions of absorption axes of polarization plates in the liquid crystal display device shown in FIG. 9(a).

FIG. 9(a) shows a state where an AC voltage not lower than a threshold voltage is applied between the pair of substrates.

In FIG. 9(a), the solid arrow shows a direction of photoirradiation (a direction of photo-alignment treatment) to a lower substrate (driving element substrate); and the dotted arrow shows a direction of photoirradiation (a direction of photo-alignment treatment) to an upper substrate (color filter substrate).

In FIG. 10(a), the dotted arrow shows a direction of photoirradiation (photo-alignment treatment direction) to a lower substrate (driving element substrate); and the solid arrow shows a direction of photoirradiation (photo-alignment treatment direction) to an upper substrate (color filter substrate).

In FIG. 10(c), the dotted line shows a domain boundary.

In FIG. 21, the rhombic marker (♦) shows the average value and the range (I) partitioned by the line segment shows a range from the largest value and the smallest value.

FIG. 22(a) shows an initial state.

FIG. 22(b) shows a state when an electrical field is applied to a liquid crystal layer.

FIG. 22(c) shows a state when the application of the electrical field to the liquid crystal layer is stopped.

FIG. 23(a) shows an initial state.

FIG. 23(b) shows a state when an electrical field is applied to a liquid crystal layer.

FIG. 23(c) shows a state when the application of the electrical field to the liquid crystal layer is stopped.

EXPLANATION OF NUMERALS AND SYMBOLS

Figure 1:
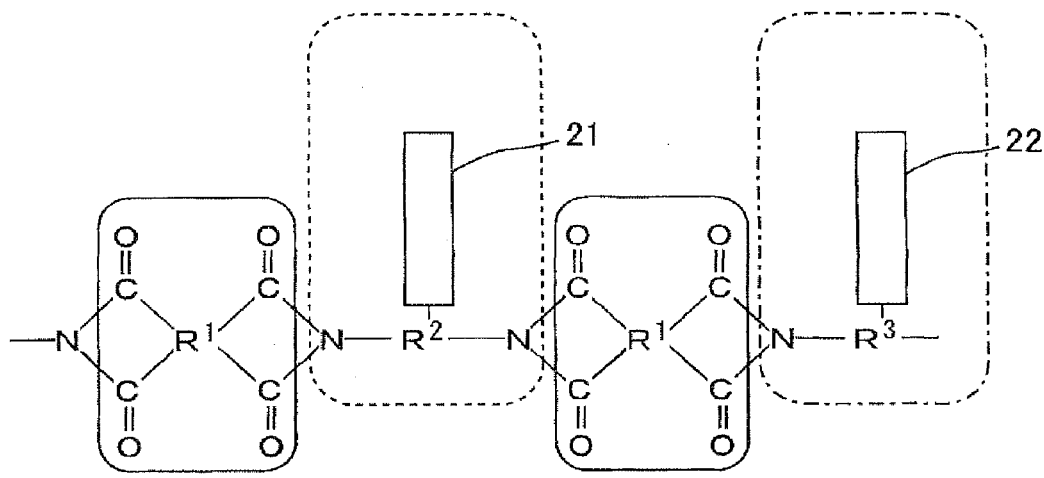
FIG. 1 shows a basic structure of the polymer included in the alignment film material in accordance with Embodiment 1.
Figure 2:
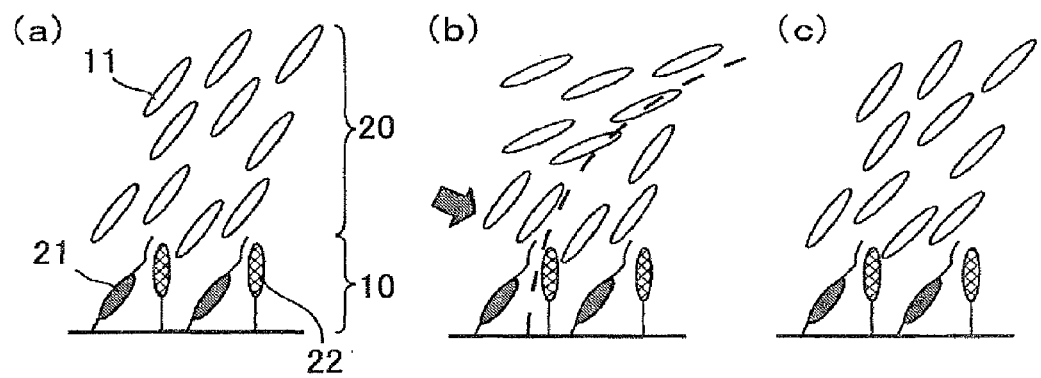
FIG. 2 is a cross-sectional view schematically showing a vicinity of the alignment film surface in the liquid crystal display device in accordance with Embodiment 1 and explaining a mechanism for suppressing AC image sticking due to side-chain deformation.
Figure 3:
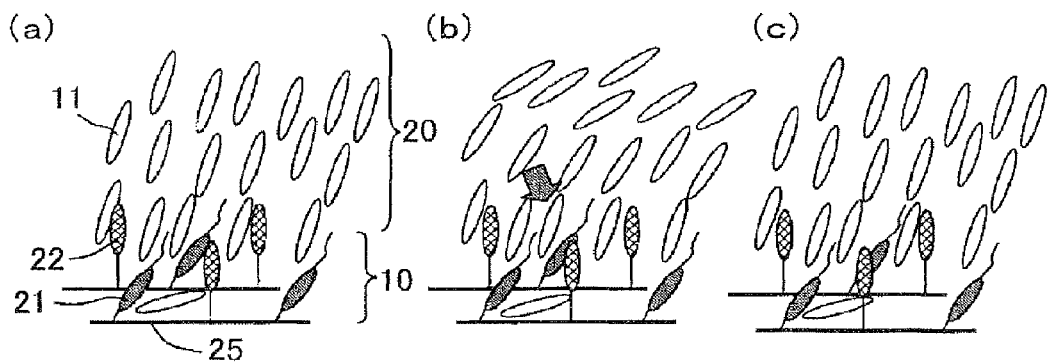
FIG. 3 is a cross-sectional view schematically showing a vicinity of the alignment film surface in the liquid crystal display device in accordance with Embodiment 1 and explaining a mechanism for suppressing AC image sticking cause by the liquid crystal adsorption.
Figure 4:
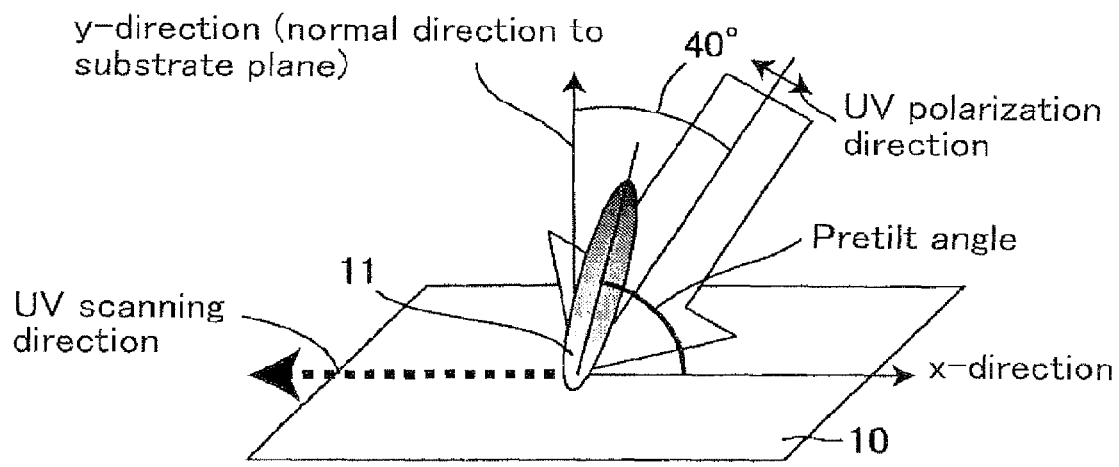
FIG. 4 is a perspective view schematically showing a relationship between a photo-alignment treatment direction and a pretilt direction of a liquid crystal molecule in accordance with Embodiment 1.
Figure 5:
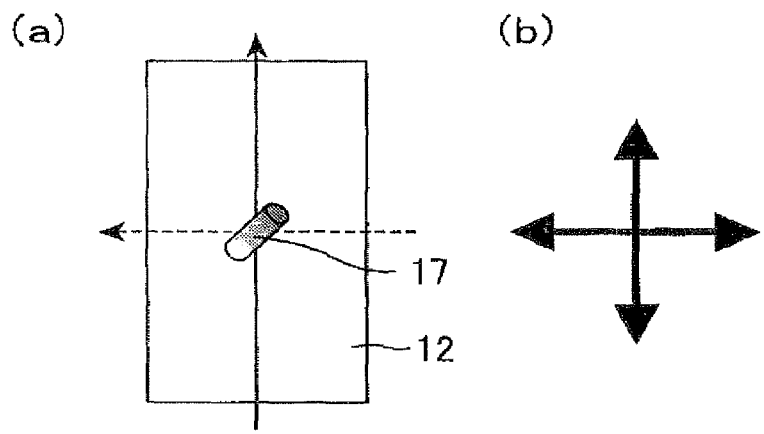
FIG. 5 (a) shows a state where the photo-alignment treatment directions are perpendicular to each other between a pair of substrates and an AC voltage not lower than a threshold voltage is applied between the pair of substrates.
Figure 6:
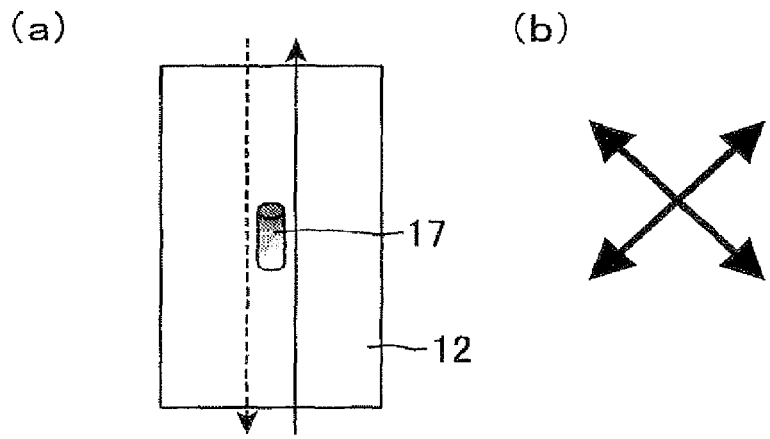
FIG. 6(a) is a plan view schematically showing a director alignment of liquid crystal in one pixel (one sub-pixel); and directions of photo-alignment treatment for a pair of substrates (upper and lower substrates) in the case that the liquid crystal display device in Embodiment 1 is a mono-domain device.
FIG. 6(b) is a schematic view showing directions of absorption axes of polarization plates arranged in the liquid crystal display device shown in FIG. 6(a).
Figure 7:
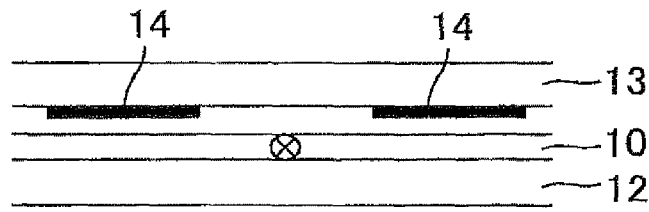
FIG. 7 is a cross-sectional view schematically showing a first arrangement relationship between substrates and a photomask in a photo-alignment treatment process in accordance with Embodiment 1 where alignment division is performed by proximity exposure using an alignment mask.
Figure 8:
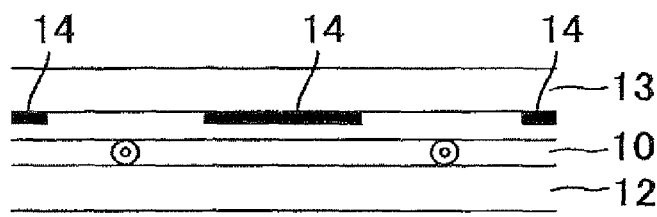
FIG. 8 is a cross-sectional view schematically showing a second arrangement relationship between substrates and a photomask in a photo-alignment treatment process in accordance with Embodiment 1 where alignment division is performed by proximity exposure using an alignment mask.
Figure 9:
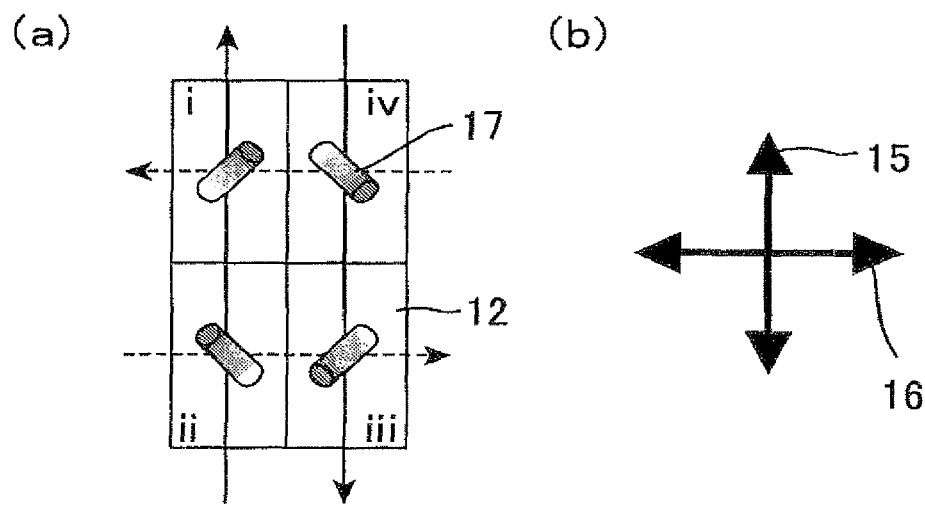
FIG. 9 (a) is a plan view schematically showing: the average director alignment of liquid crystal in one pixel (one sub-pixel); directions of photo-alignment treatment for a pair of substrates (upper and lower substrates); and a arrangement pattern of a multi-domain, in the case that the liquid crystal display device in Embodiment 1 is a four-domain device.
Figure 10:
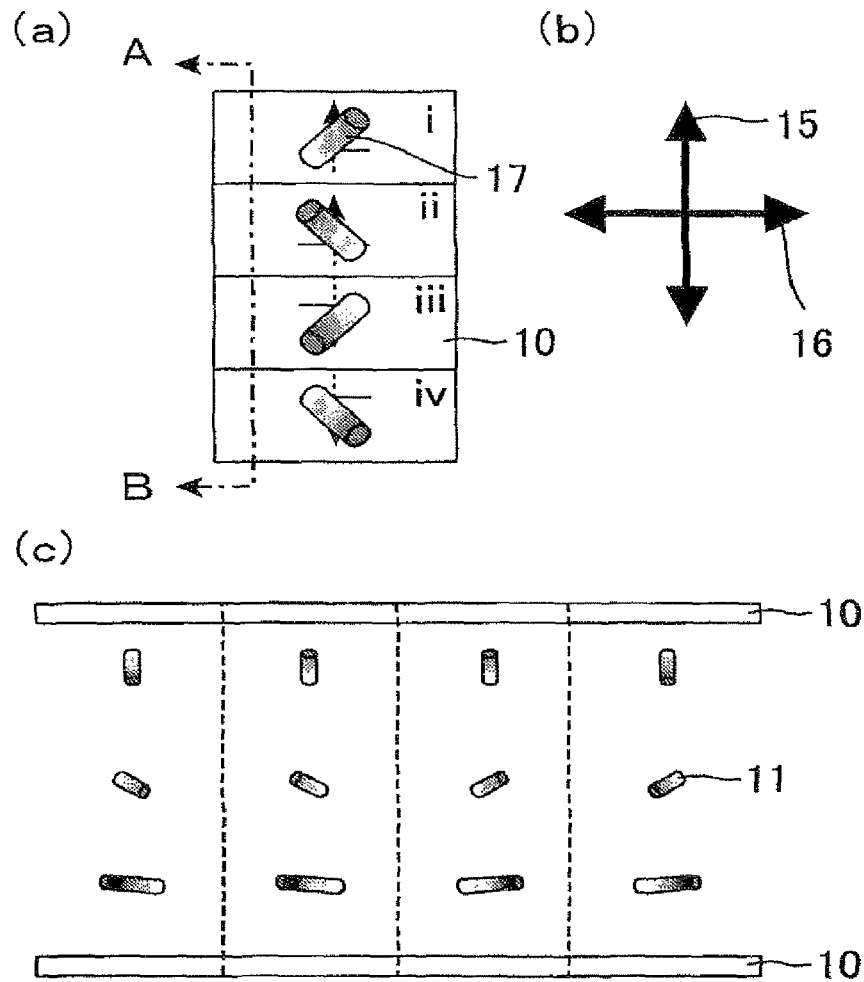
FIG. 10(a) is a plan view schematically showing: the average director alignment of liquid crystal in one pixel (one sub-pixel); directions of photo-alignment treatment for a pair of substrates (upper and lower substrates); and a pattern of a multi-domain, in the case that the liquid crystal display device in Embodiment 1 has four domain different from that in FIG. 9(a).
FIG. 10(b) is a schematic view showing directions of absorption axes of polarization plates in the liquid crystal display device shown in FIG. 10(a).
FIG. 10(c) is a schematic cross-sectional view taken along line A-B in FIG. 10(a), and shows alignment directions of liquid crystal molecules when an AC voltage not lower than a threshold voltage is applied between the pair of substrates.
Figure 11:
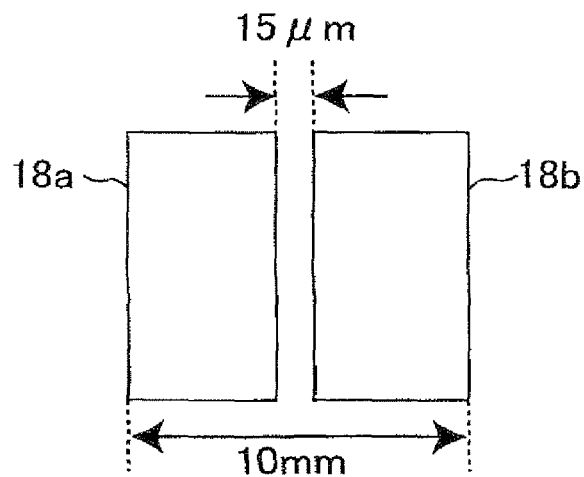
FIG. 11 is a plan view schematically showing transparent electrodes in an evaluation cell (liquid crystal display device) used in the AC image sticking evaluation test.
Figure 12:
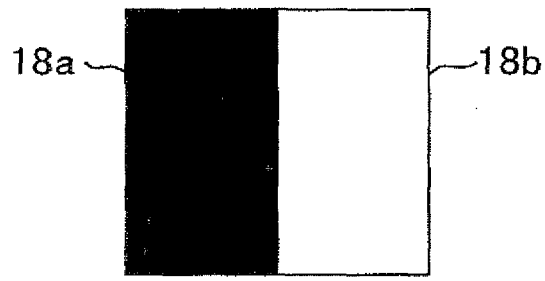
FIG. 12 is a plan view schematically showing a display state of the evaluation cell (liquid crystal display device) when a current is applied to the cell in the AC image sticking evaluation test.
Figure 13:
FIG. 13 is a plan view schematically showing a display state of the evaluation cell (liquid crystal display device) when the AC image sticking evaluation test is performed.
Figure 14:
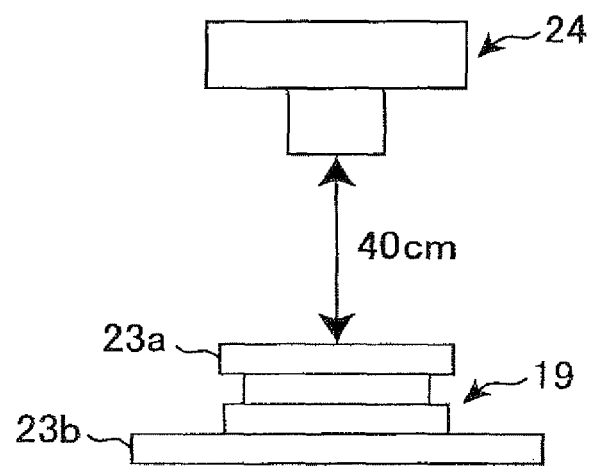
FIG. 14 is a side view schematically showing an arrangement relationship between the evaluation cell (liquid crystal display device) and a digital camera when the AC image sticking evaluation test is performed.
Figure 15:
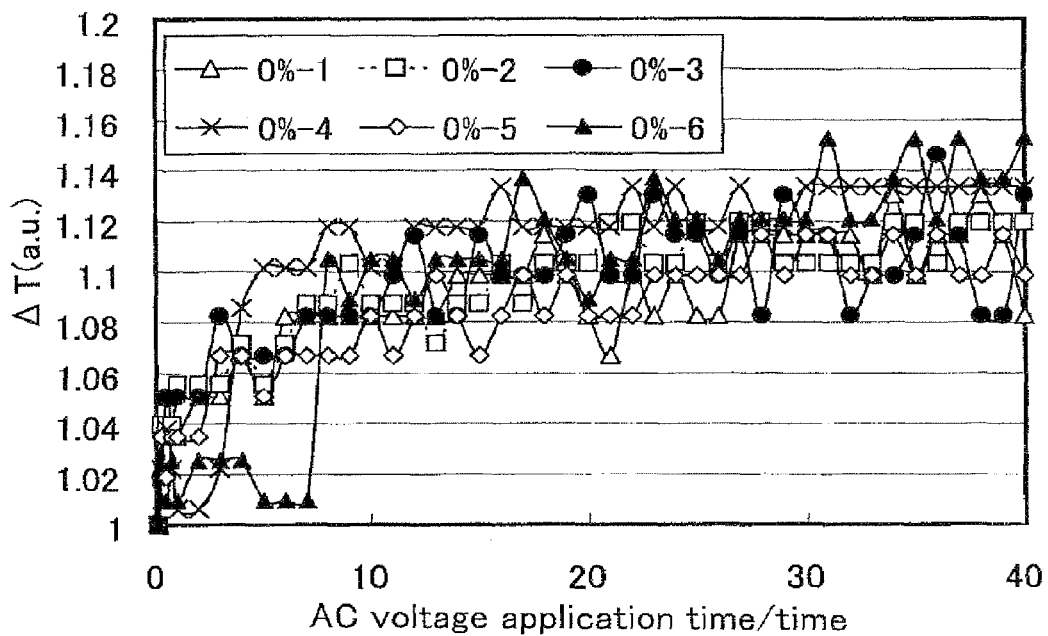
FIG. 15 is a graph showing $\Delta T$ characteristics of an evaluation cell (liquid crystal display device) having an alignment film with 0% by weight of an introduction ratio of the vertical alignment diamine unit containing no photofunctional groups to the photo-alignment diamine unit.
Figure 16:
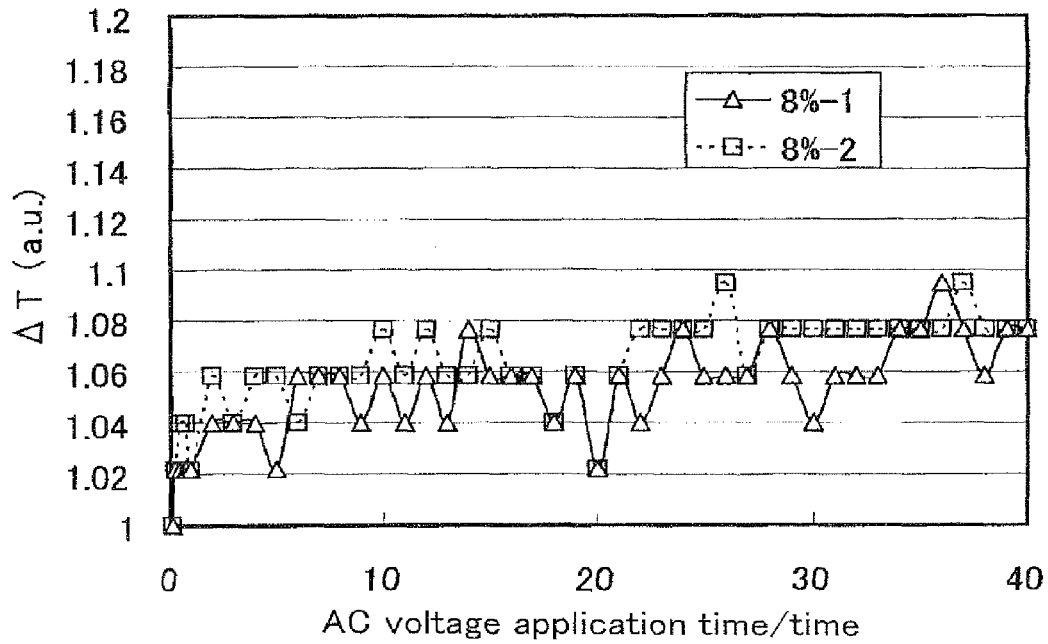
FIG. 16 is a graph showing $\Delta T$ characteristics of an evaluation cell (liquid crystal display device) having an alignment film with 8% by weight of an introduction ratio of the vertical alignment diamine unit containing no photofunctional groups to the photo-alignment diamine unit.
Figure 17:
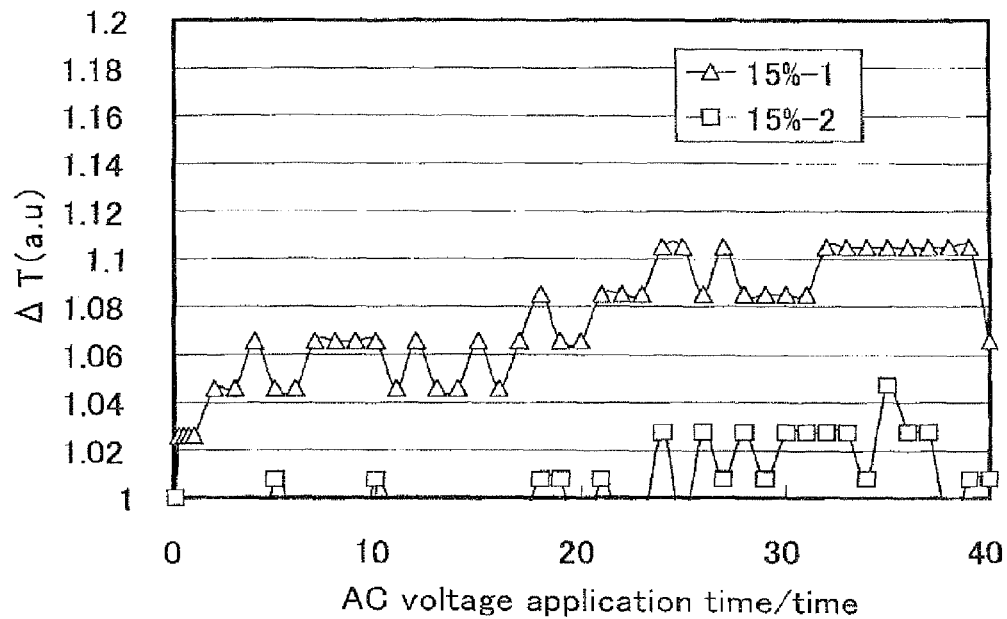
FIG. 17 is a graph showing $\Delta T$ characteristics of an evaluation cell (liquid crystal display device) having an alignment film with 15% by weight of an introduction ratio of the vertical alignment diamine unit containing no photofunctional groups to the photo-alignment diamine unit.
Figure 18:
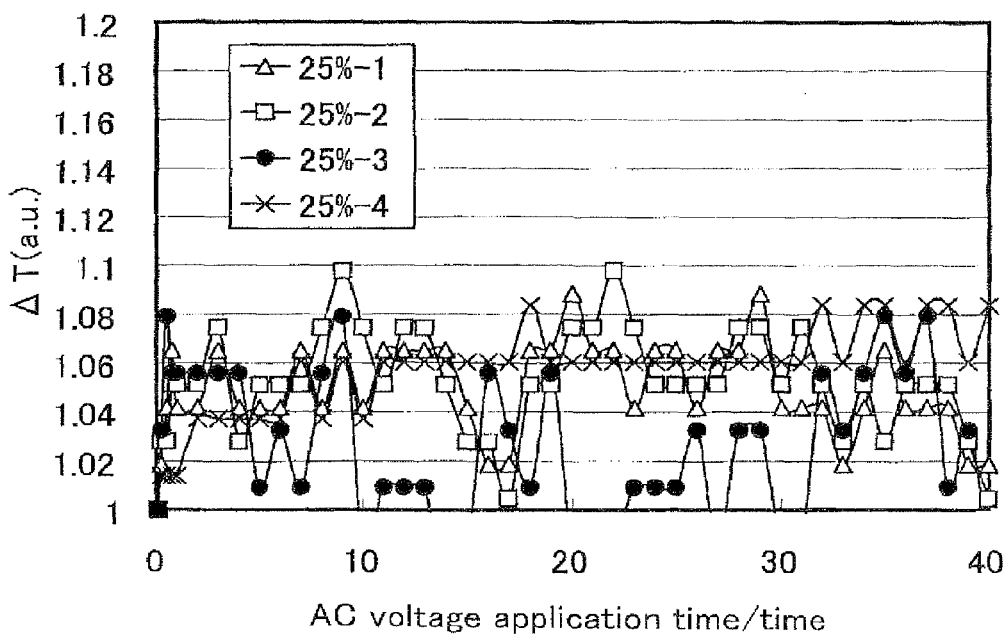
FIG. 18 is a graph showing $\Delta T$ characteristics of an evaluation cell (liquid crystal display device) having an alignment film with 25% by weight of an introduction ratio of the vertical alignment diamine unit containing no photofunctional groups to the photo-alignment diamine unit.
Figure 19:
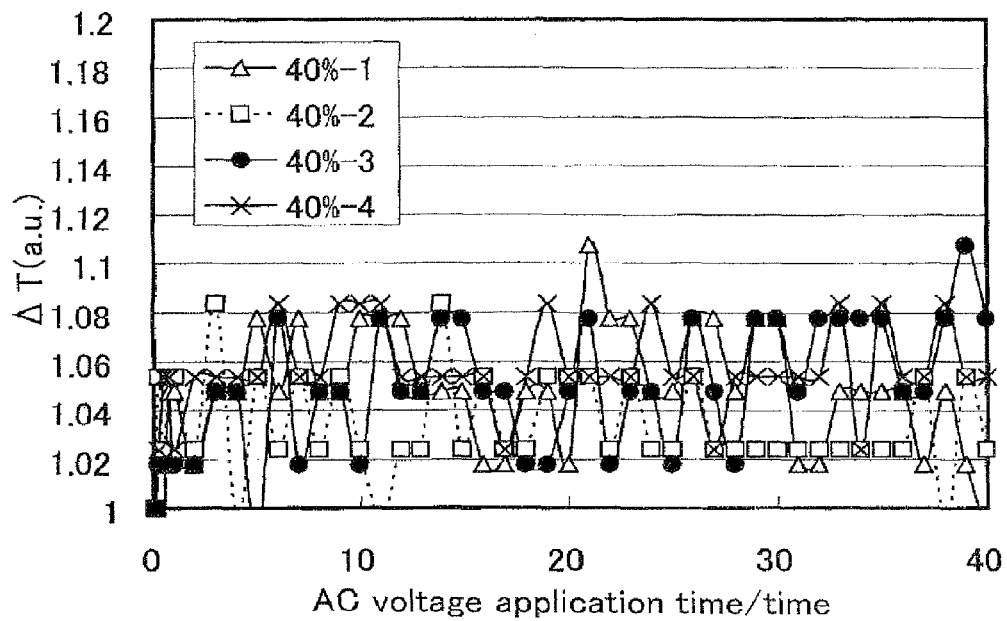
FIG. 19 is a graph showing $\Delta T$ characteristics of an evaluation cell (liquid crystal display device) having an alignment film with 40% by weight of an introduction ratio of the vertical alignment diamine unit containing no photofunctional groups to the photo-alignment diamine unit.
Figure 20:
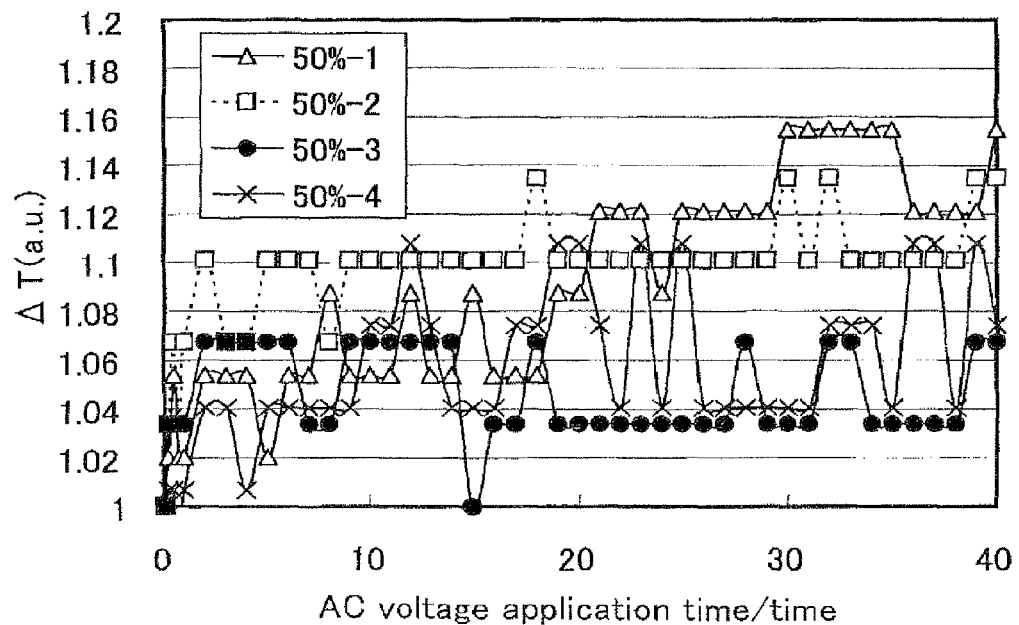
FIG. 20 is a graph showing $\Delta T$ characteristics of an evaluation cell (liquid crystal display device) having an alignment film with 50% by weight of an introduction ratio of the vertical alignment diamine unit containing no photofunctional groups to the photo-alignment diamine unit.
Figure 21:
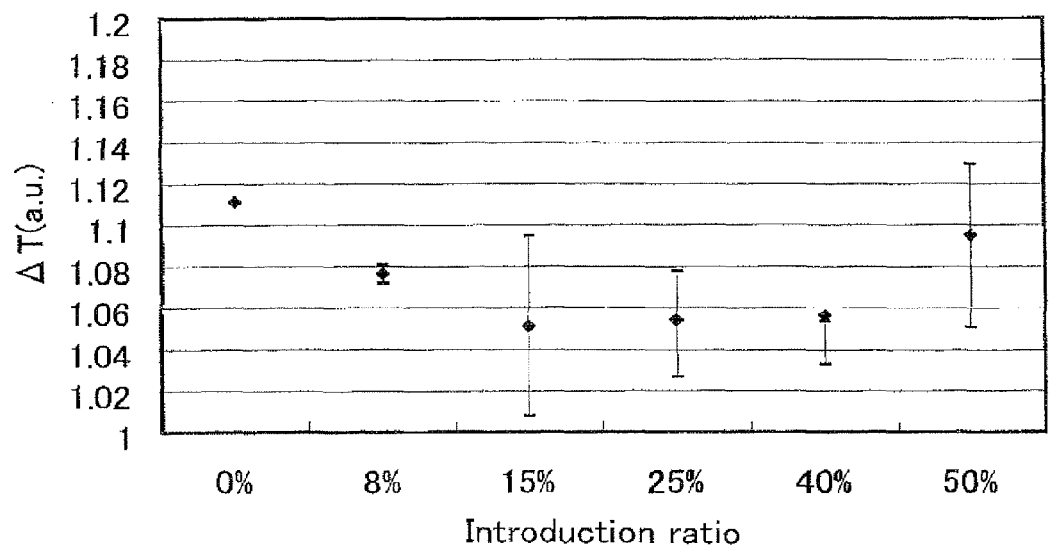
FIG. 21 is a graph showing $\Delta T$ characteristics after 40 hour's AC voltage application to the evaluation cells with introduction ratios of 0%, 15%, 25%, 40%, and 50%.
Figure 22:
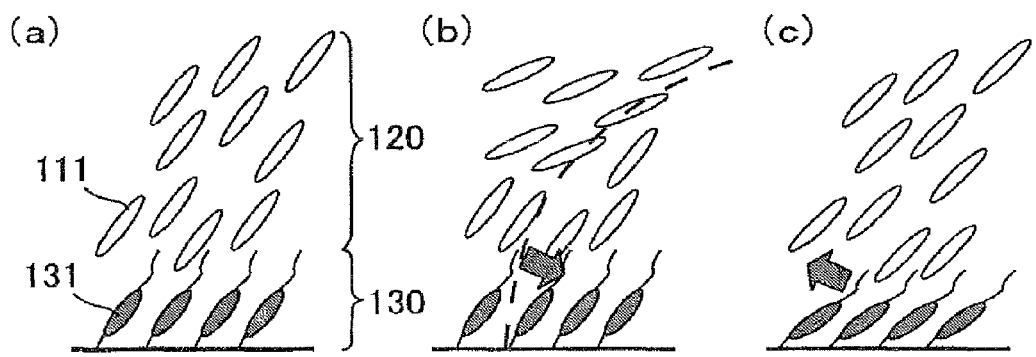
FIG. 22 is a cross-sectional view schematically showing a vicinity of a conventional photo-alignment film surface and explaining a mechanism for generation of AC image sticking due to side-chain deformation.
Figure 23:
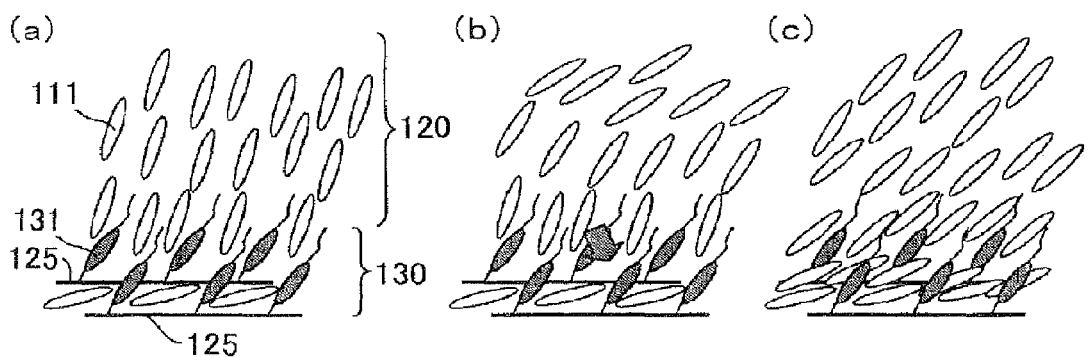
FIG. 23 is a cross-sectional view schematically showing a vicinity of a conventional photo-alignment film surface and explaining a mechanism for generation of AC image sticking due to liquid crystal adsorption.

10: Alignment film
11, 111: Liquid crystal molecule
12: Upper and lower substrates
13: Photomask
14: Light-shielding part
15: Direction of absorption axis of polarization plate on lower substrate side 16: Direction of absorption axis of polarization plate on upper substrate side
17: Average liquid crystal director direction under AC voltage application
18a, 18b: Electrode
19: Liquid crystal display device
20, 120: Liquid crystal layer
21: Side chain containing a photofunctional group
22: Side chain containing a vertical alignment functional group
23a: Upper polarization plate
23b: Lower polarization plate
24: Digital camera
25, 125: Main chain
130: Photo-alignment film
131: Side chain

The invention claimed is:

1. A liquid crystal display device comprising:
a pair of substrates;
a liquid crystal layer comprising liquid crystal molecules; and
an alignment film,
the liquid crystal layer being interposed between the pair of substrates,
the alignment film being arranged on a liquid crystal layer side-surface of at least one of the pair of substrates,
wherein the alignment film is obtainable by providing a film with an alignment treatment by photoirradiation,
the alignment film being formed from an alignment film material, the alignment film material including a copolymer containing a first constitutional unit and a second constitutional unit,
wherein a structure of the first constitutional unit is different than a structure of the second constitutional unit before and after the photoirradiation;
the first constitutional unit exhibiting a property of controlling alignment of the liquid crystal molecules by photoirradiation, and
the second constitutional unit exhibiting the property of controlling alignment of the liquid crystal molecules regardless of photoirradiation.

2. The liquid crystal display device according to claim 1, wherein the alignment film is a vertical alignment film that aligns the liquid crystal molecules vertically, and aligns the liquid crystal molecules in such a way than a average pretilt angle of the liquid crystal layer is 87° or more, and 89.5° or less, and
the liquid crystal molecules are uniformly aligned in a plane of the alignment film.

3. The liquid crystal display device according to claim 1, wherein the first constitutional unit has a side chain containing a cinnamate group as a photofunctional group, and
the second constitutional has a side cabin containing a steroid skeleton.

4. The liquid crystal display device according to claim 1, wherein the polymer has at least one main chain structure selected from the group consisting of a polyamic acid, a polyimide and a polysiloxane.

5. The liquid crystal display device according to claim 1, wherein a ratio by weight of a monomer component of the second constitutional unit to a monomer component of the first constitutional unit is 4% or more.

6. The liquid crystal display device according to claim 1, comprising pixels arranged in a matrix pattern,
the pixels including a pixel electrode and a common electrode,
the pixel electrode being arranged in a matrix pattern on a liquid crystal layer side-surface of one of the pair of substrates,
the common electrode being arranged on a liquid crystal layer side-surface of the other substrate,
wherein the pixels include two or more domains adjacent to each other,
average directors in the four domains have a 4-fold rotational symmetry, and
directions of the average directors change in such a manner that the average directors rotate at an interval of 90 degrees.

* * * * *